(12) United States Patent
Ivey et al.

(10) Patent No.: US 10,176,689 B2
(45) Date of Patent: *Jan. 8, 2019

(54) INTEGRATION OF LED LIGHTING CONTROL WITH EMERGENCY NOTIFICATION SYSTEMS

(71) Applicant: iLumisys, Inc., Troy, MI (US)

(72) Inventors: John Ivey, Farmington Hills, MI (US); David L. Simon, Grosse Point Woods, MI (US)

(73) Assignee: iLumisys, Inc., Troy, MI (US)

( * ) Notice: Subject to any disclaimer, the term of this patent is extended or adjusted under 35 U.S.C. 154(b) by 451 days.

This patent is subject to a terminal disclaimer.

(21) Appl. No.: 14/477,335

(22) Filed: Sep. 4, 2014

(65) Prior Publication Data

US 2014/0368342 A1    Dec. 18, 2014

Related U.S. Application Data

(63) Continuation of application No. 13/848,387, filed on Mar. 21, 2013, now Pat. No. 8,830,080, which is a (Continued)

(51) Int. Cl.
| G08B 5/22 | (2006.01) |
| G08B 21/02 | (2006.01) |
| F21V 33/00 | (2006.01) |
| G08B 7/06 | (2006.01) |
| H05B 33/08 | (2006.01) |
| G08B 5/36 | (2006.01) |

(Continued)

(52) U.S. Cl.
CPC .......... *G08B 21/02* (2013.01); *F21V 33/0076* (2013.01); *G08B 5/36* (2013.01); *G08B 7/06* (2013.01); *H05B 33/0854* (2013.01); *H05B 37/0272* (2013.01); *F21K 9/27* (2016.08); *F21Y 2115/10* (2016.08); *H02J 9/065* (2013.01); *Y02B 20/383* (2013.01)

(58) Field of Classification Search
None
See application file for complete search history.

(56) References Cited

U.S. PATENT DOCUMENTS

| D54,511 S | 2/1920 | Owen |
| D58,105 S | 6/1921 | Poritz |

(Continued)

FOREIGN PATENT DOCUMENTS

| CN | 1584388 A | 2/2005 |
| CN | 2766345 Y | 3/2006 |

(Continued)

OTHER PUBLICATIONS

European Office Action in EP098224249, a related matter, dated Jan. 13, 2015, 2 pages.

(Continued)

*Primary Examiner* — Julie Lieu
(74) *Attorney, Agent, or Firm* — Fish & Richardson P.C.

(57) ABSTRACT

An emergency lighting system for a building includes at least one LED-based light. An emergency detector is operable to detect an emergency. The emergency detector produces an emergency signal in response to the emergency. A controller is operable to control the at least one LED-based light in response to the emergency signal.

21 Claims, 2 Drawing Sheets

Related U.S. Application Data continuation of application No. 12/257,773, filed on Oct. 24, 2008, now Pat. No. 8,653,984.

(51) Int. Cl.
*H05B 37/02* (2006.01)
*H02J 9/06* (2006.01)
*F21K 9/27* (2016.01)
*F21Y 115/10* (2016.01)

(56) References Cited

U.S. PATENT DOCUMENTS

| | | |
|---|---|---|
| D79,814 S | 11/1929 | Hoch |
| D80,419 S | 1/1930 | Kramer |
| D84,763 S | 7/1931 | Stange |
| D119,797 S | 4/1940 | Winkler et al. |
| D125,312 S | 2/1941 | Logan |
| 2,826,679 A | 3/1958 | Rosenburg |
| 2,909,097 A | 10/1959 | Alden et al. |
| 317,862 A | 4/1965 | Paul et al. |
| 3,272,977 A | 9/1966 | Holmes |
| 3,318,185 A | 5/1967 | Hermann |
| 3,561,719 A | 2/1971 | Grindle |
| 3,586,936 A | 6/1971 | Mcleroy |
| 3,601,621 A | 8/1971 | Ritchie |
| 3,612,855 A | 10/1971 | Juhnke |
| 3,643,088 A | 2/1972 | Osteen et al. |
| 3,739,336 A | 6/1973 | Burland |
| 3,746,918 A | 7/1973 | Drucker et al. |
| 3,818,216 A | 6/1974 | Larraburu |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,969,720 A * | 7/1976 | Nishino ............... G08B 7/066 340/309.4 |
| 3,974,637 A | 8/1976 | Bergey et al. |
| 3,993,386 A | 11/1976 | Rowe |
| 4,001,571 A | 1/1977 | Martin |
| 4,054,814 A | 10/1977 | Fegley et al. |
| 4,070,568 A | 1/1978 | Gala |
| 4,082,395 A | 4/1978 | Donato et al. |
| 4,096,349 A | 6/1978 | Donato |
| 4,102,558 A | 7/1978 | Krachman |
| 4,107,581 A | 8/1978 | Abernethy |
| 4,189,663 A | 2/1980 | Schmutzer et al. |
| 4,211,955 A | 7/1980 | Ray |
| 4,241,295 A | 12/1980 | Williams, Jr. |
| 4,261,029 A | 4/1981 | Mousset |
| 4,262,255 A | 4/1981 | Kokei et al. |
| 4,271,408 A | 6/1981 | Teshima et al. |
| 4,271,458 A | 6/1981 | George, Jr. |
| 4,272,689 A | 6/1981 | Crosby et al. |
| 4,273,999 A | 6/1981 | Pierpoint |
| 4,298,869 A | 11/1981 | Okuno |
| 4,329,625 A | 5/1982 | Nishizawa et al. |
| 4,339,788 A | 7/1982 | White et al. |
| 4,342,947 A | 8/1982 | Bloyd |
| 4,344,117 A | 8/1982 | Niccum |
| 4,367,464 A | 1/1983 | Kurahashi et al. |
| D268,134 S | 3/1983 | Zurcher |
| 4,382,272 A | 5/1983 | Quella et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,394,719 A | 7/1983 | Moberg |
| 4,420,711 A | 12/1983 | Takahashi et al. |
| 4,455,562 A | 6/1984 | Dolan et al. |
| 4,500,796 A | 2/1985 | Quin |
| 4,521,835 A | 6/1985 | Meggs et al. |
| 4,531,114 A * | 7/1985 | Topol ............... A62B 3/00 340/332 |
| 4,581,687 A | 4/1986 | Nakanishi |
| 4,597,033 A * | 6/1986 | Meggs ............... B60Q 3/0233 362/183 |
| 4,600,972 A | 7/1986 | MacIntyre |
| 4,607,317 A | 8/1986 | Lin |
| 4,622,881 A | 11/1986 | Rand |
| 4,625,152 A | 11/1986 | Nakai |
| 4,635,052 A | 1/1987 | Aoike et al. |
| 4,647,217 A | 3/1987 | Havel |
| 4,650,971 A | 3/1987 | Manecci et al. |
| 4,656,398 A | 4/1987 | Michael et al. |
| 4,661,890 A | 4/1987 | Watanabe et al. |
| 4,668,895 A | 5/1987 | Schneiter |
| 4,669,033 A | 5/1987 | Lee |
| 4,675,575 A | 6/1987 | Smith et al. |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,698,730 A | 10/1987 | Sakai et al. |
| 4,701,669 A | 10/1987 | Head et al. |
| D292,766 S | 11/1987 | Zhu et al. |
| 4,705,406 A | 11/1987 | Havel |
| 4,707,141 A | 11/1987 | Havel |
| D293,723 S | 1/1988 | Buttner |
| 4,727,289 A | 2/1988 | Uchida |
| 4,739,454 A | 4/1988 | Federgreen |
| 4,740,882 A | 4/1988 | Miller |
| 4,748,545 A | 5/1988 | Schmitt |
| 4,753,148 A | 6/1988 | Johnson |
| 4,758,173 A | 7/1988 | Northrop |
| 4,765,708 A | 8/1988 | Becker et al. |
| 4,771,274 A | 9/1988 | Havel |
| 4,780,621 A | 10/1988 | Bartleucci et al. |
| 4,794,373 A | 12/1988 | Harrison |
| 4,794,383 A | 12/1988 | Havel |
| 4,801,928 A * | 1/1989 | Minter ............... G08B 7/066 340/309.4 |
| 4,810,937 A | 3/1989 | Havel |
| 4,818,072 A | 4/1989 | Mohebban |
| 4,824,269 A | 4/1989 | Havel |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,847,536 A | 7/1989 | Lowe et al. |
| 4,851,972 A | 7/1989 | Altman |
| 4,854,701 A | 8/1989 | Noll et al. |
| 4,857,801 A | 8/1989 | Farrell |
| 4,863,223 A | 9/1989 | Weissenbach et al. |
| 4,870,325 A | 9/1989 | Kazar |
| 4,874,320 A | 10/1989 | Freed et al. |
| 4,887,074 A | 12/1989 | Simon et al. |
| 4,894,832 A | 1/1990 | Colak |
| 4,901,207 A | 2/1990 | Sato et al. |
| 4,904,988 A * | 2/1990 | Nesbit ............... G08B 17/00 340/539.1 |
| 4,912,371 A | 3/1990 | Hamilton |
| 4,920,459 A | 4/1990 | Rothwell, Jr. et al. |
| 4,922,154 A | 5/1990 | Cacoub |
| 4,929,936 A * | 5/1990 | Friedman ............... G08B 7/064 340/815.45 |
| 4,934,852 A | 6/1990 | Havel |
| 4,941,072 A | 7/1990 | Yasumoto et al. |
| 4,943,900 A | 7/1990 | Gartner |
| 4,962,687 A | 10/1990 | Belliveau et al. |
| 4,965,561 A | 10/1990 | Havel |
| 4,973,835 A | 11/1990 | Kurosu et al. |
| 4,977,351 A * | 12/1990 | Bavaro ............... H02J 9/065 307/66 |
| 4,979,081 A | 12/1990 | Leach et al. |
| 4,979,180 A | 12/1990 | Muncheryan |
| 4,980,806 A | 12/1990 | Taylor et al. |
| 4,991,070 A | 2/1991 | Stob |
| 4,992,704 A | 2/1991 | Stinson |
| 5,003,227 A | 3/1991 | Nilssen |
| 5,008,595 A | 4/1991 | Kazar |
| 5,008,788 A | 4/1991 | Palinkas |

(56) References Cited

U.S. PATENT DOCUMENTS

| | | |
|---|---|---|
| 5,010,459 A | 4/1991 | Taylor et al. |
| 5,018,054 A | 5/1991 | Ohashi et al. |
| 5,027,037 A | 6/1991 | Wei |
| 5,027,262 A | 6/1991 | Freed |
| 5,032,960 A | 7/1991 | Katoh |
| 5,034,807 A | 7/1991 | Von Kohorn |
| 5,036,248 A | 7/1991 | McEwan et al. |
| 5,038,255 A | 8/1991 | Nishihashi et al. |
| 5,065,226 A | 11/1991 | Kluitmans et al. |
| 5,072,216 A | 12/1991 | Grange |
| 5,078,039 A | 1/1992 | Tulk et al. |
| 5,083,063 A | 1/1992 | Brooks |
| 5,088,013 A | 2/1992 | Revis |
| 5,089,748 A | 2/1992 | Ihms |
| 5,103,382 A | 4/1992 | Kondo et al. |
| 5,122,733 A | 6/1992 | Havel |
| 5,126,634 A | 6/1992 | Johnson |
| 5,128,595 A | 7/1992 | Hara |
| 5,130,909 A | 7/1992 | Gross |
| 5,134,387 A | 7/1992 | Smith et al. |
| 5,136,483 A | 8/1992 | Schoniger et al. |
| 5,140,220 A | 8/1992 | Hasegawa |
| 5,142,199 A | 8/1992 | Elwell |
| 5,151,679 A | 9/1992 | Dimmick |
| 5,154,641 A | 10/1992 | McLaughlin |
| 5,161,879 A | 11/1992 | McDermott |
| 5,161,882 A | 11/1992 | Garrett |
| 5,164,715 A | 11/1992 | Kashiwabara et al. |
| 5,184,114 A | 2/1993 | Brown |
| 5,194,854 A | 3/1993 | Havel |
| 5,198,756 A | 3/1993 | Jenkins et al. |
| 5,209,560 A | 5/1993 | Taylor et al. |
| 5,220,250 A | 6/1993 | Szuba |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,278,542 A | 1/1994 | Smith et al. |
| 5,281,961 A | 1/1994 | Elwell |
| 5,282,121 A | 1/1994 | Bornhorst et al. |
| 5,283,517 A | 2/1994 | Havel |
| 5,287,352 A | 2/1994 | Jackson et al. |
| 5,294,865 A | 3/1994 | Haraden |
| 5,298,871 A | 3/1994 | Shimohara |
| 5,301,090 A | 4/1994 | Hed |
| 5,303,124 A | 4/1994 | Wrobel |
| 5,307,295 A | 4/1994 | Taylor et al. |
| 5,321,593 A | 6/1994 | Moates |
| 5,323,226 A | 6/1994 | Schreder |
| 5,329,431 A | 7/1994 | Taylor et al. |
| 5,341,988 A | 8/1994 | Rein et al. |
| 5,344,068 A | 9/1994 | Haessig |
| 5,350,977 A | 9/1994 | Hamamoto et al. |
| 5,357,170 A | 10/1994 | Luchaco et al. |
| 5,365,411 A | 11/1994 | Rycroft et al. |
| 5,371,618 A | 12/1994 | Tai et al. |
| 5,374,876 A | 12/1994 | Horibata et al. |
| 5,375,043 A | 12/1994 | Tokunaga |
| D354,360 S | 1/1995 | Murata |
| 5,381,074 A | 1/1995 | Rudzewicz et al. |
| 5,388,357 A | 2/1995 | Malita |
| 5,402,702 A | 4/1995 | Hata |
| 5,404,094 A | 4/1995 | Green et al. |
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |
| 5,412,552 A | 5/1995 | Fernandes |
| 5,420,482 A | 5/1995 | Phares |
| 5,421,059 A | 6/1995 | Leffers, Jr. |
| 5,430,356 A | 7/1995 | Ference et al. |
| 5,432,408 A | 7/1995 | Matsuda et al. |
| 5,436,535 A | 7/1995 | Yang |
| 5,436,853 A | 7/1995 | Shimohara |
| 5,450,301 A | 9/1995 | Waltz et al. |
| 5,461,188 A | 10/1995 | Drago et al. |
| 5,463,280 A | 10/1995 | Johnson |
| 5,463,502 A | 10/1995 | Savage, Jr. |
| 5,465,144 A | 11/1995 | Parker et al. |
| 5,473,522 A | 12/1995 | Kriz et al. |
| 5,475,300 A | 12/1995 | Havel |
| 5,481,441 A | 1/1996 | Stevens |
| 5,489,827 A | 2/1996 | Xia |
| 5,491,402 A | 2/1996 | Small |
| 5,493,183 A | 2/1996 | Kimball |
| 5,504,395 A | 4/1996 | Johnson et al. |
| 5,506,760 A | 4/1996 | Giebler et al. |
| 5,513,082 A | 4/1996 | Asano |
| 5,519,496 A | 5/1996 | Borgert et al. |
| 5,530,322 A | 6/1996 | Ference et al. |
| 5,539,628 A | 7/1996 | Seib |
| 5,544,809 A | 8/1996 | Keating et al. |
| 5,545,950 A | 8/1996 | Cho |
| 5,550,440 A | 8/1996 | Allison et al. |
| 5,559,681 A | 9/1996 | Duarte |
| 5,561,346 A | 10/1996 | Byrne |
| D376,030 S | 11/1996 | Cohen |
| 5,575,459 A | 11/1996 | Anderson |
| 5,575,554 A | 11/1996 | Guritz |
| 5,581,158 A | 12/1996 | Quazi |
| 5,592,051 A | 1/1997 | Korkala |
| 5,592,054 A | 1/1997 | Nerone et al. |
| 5,600,199 A | 2/1997 | Martin, Sr. et al. |
| 5,607,227 A | 3/1997 | Yasumoto et al. |
| 5,608,290 A | 3/1997 | Hutchisson et al. |
| 5,614,788 A | 3/1997 | Mullins et al. |
| 5,621,282 A | 4/1997 | Haskell |
| 5,621,603 A | 4/1997 | Adamec et al. |
| 5,621,662 A | 4/1997 | Humphries et al. |
| 5,622,423 A | 4/1997 | Lee |
| 5,633,629 A | 5/1997 | Hochstein |
| 5,634,711 A | 6/1997 | Kennedy et al. |
| 5,640,061 A | 6/1997 | Bornhorst et al. |
| 5,640,141 A | 6/1997 | Myllymaki |
| 5,642,129 A | 6/1997 | Zavracky et al. |
| 5,655,830 A | 8/1997 | Ruskouski |
| 5,656,935 A | 8/1997 | Havel |
| 5,661,374 A | 8/1997 | Cassidy et al. |
| 5,661,645 A | 8/1997 | Hochstein |
| 5,673,059 A | 9/1997 | Zavracky et al. |
| 5,682,103 A | 10/1997 | Burrell |
| 5,684,523 A | 11/1997 | Satoh et al. |
| 5,688,042 A | 11/1997 | Madadi et al. |
| 5,697,695 A | 12/1997 | Lin et al. |
| 5,701,058 A | 12/1997 | Roth |
| 5,712,650 A | 1/1998 | Barlow |
| 5,713,655 A * | 2/1998 | Blackman ............... F21S 9/022 |
| | | 200/312 |
| 5,721,471 A | 2/1998 | Begemann et al. |
| 5,725,148 A | 3/1998 | Hartman |
| 5,726,535 A | 3/1998 | Yan |
| 5,731,759 A | 3/1998 | Finucan |
| 5,734,590 A | 3/1998 | Tebbe |
| 5,751,118 A | 5/1998 | Mortimer |
| 5,752,766 A | 5/1998 | Bailey et al. |
| 5,765,940 A | 6/1998 | Levy et al. |
| 5,769,527 A | 6/1998 | Taylor et al. |
| 5,781,108 A | 7/1998 | Jacob et al. |
| 5,784,006 A | 7/1998 | Hochstein |
| 5,785,227 A | 7/1998 | Akiba |
| 5,790,329 A | 8/1998 | Klaus et al. |
| 5,803,579 A | 9/1998 | Turnbull et al. |
| 5,803,580 A | 9/1998 | Tseng |
| 5,803,729 A | 9/1998 | Tsimerman |
| 5,806,965 A | 9/1998 | Deese |
| 5,808,689 A | 9/1998 | Small |
| 5,810,463 A | 9/1998 | Kawahara et al. |
| 5,812,105 A | 9/1998 | Van de Ven |
| 5,813,751 A | 9/1998 | Shaffer |
| 5,813,753 A | 9/1998 | Vriens et al. |
| 5,821,695 A | 10/1998 | Vilanilam et al. |
| 5,825,051 A | 10/1998 | Bauer et al. |
| 5,828,178 A | 10/1998 | York et al. |

(56) References Cited

U.S. PATENT DOCUMENTS

| | | | |
|---|---|---|---|
| 5,831,522 A * | 11/1998 | Weed | B60Q 7/00 |
| | | | 116/63 P |
| 5,836,676 A | 11/1998 | Ando et al. | |
| 5,841,177 A | 11/1998 | Komoto et al. | |
| 5,848,837 A * | 12/1998 | Gustafson | B64F 1/002 |
| | | | 362/235 |
| 5,850,126 A | 12/1998 | Kanbar | |
| 5,851,063 A | 12/1998 | Doughty et al. | |
| 5,852,658 A | 12/1998 | Knight et al. | |
| 5,854,542 A | 12/1998 | Forbes | |
| RE36,030 E | 1/1999 | Nadeau | |
| 5,859,508 A | 1/1999 | Ge et al. | |
| 5,865,529 A | 2/1999 | Yan | |
| 5,890,794 A | 4/1999 | Abtahi et al. | |
| 5,896,010 A | 4/1999 | Mikolajczak et al. | |
| 5,904,415 A | 5/1999 | Robertson et al. | |
| 5,907,742 A | 5/1999 | Johnson et al. | |
| 5,909,378 A | 6/1999 | De Milleville | |
| 5,912,653 A | 6/1999 | Fitch | |
| 5,917,287 A | 6/1999 | Haederle et al. | |
| 5,917,534 A | 6/1999 | Rajeswaran | |
| 5,921,660 A | 7/1999 | Yu | |
| 5,924,784 A | 7/1999 | Chliwnyj et al. | |
| 5,927,845 A | 7/1999 | Gustafson et al. | |
| 5,934,792 A | 8/1999 | Camarota | |
| 5,936,599 A | 8/1999 | Reymond | |
| 5,943,802 A | 8/1999 | Tijanic | |
| 5,946,209 A | 8/1999 | Eckel et al. | |
| 5,949,347 A | 9/1999 | Wu | |
| 5,951,145 A | 9/1999 | Iwasaki et al. | |
| 5,952,680 A | 9/1999 | Strite | |
| 5,959,547 A | 9/1999 | Tubel et al. | |
| 5,961,072 A | 10/1999 | Bodle | |
| 5,962,989 A | 10/1999 | Baker | |
| 5,962,992 A | 10/1999 | Huang et al. | |
| 5,963,185 A | 10/1999 | Havel | |
| 5,966,069 A * | 10/1999 | Zmurk | G08B 7/062 |
| | | | 307/64 |
| 5,971,597 A | 10/1999 | Baldwin et al. | |
| 5,973,594 A | 10/1999 | Baldwin et al. | |
| 5,974,553 A | 10/1999 | Gandar | |
| 5,980,064 A | 11/1999 | Metroyanis | |
| 5,998,925 A | 12/1999 | Shimizu et al. | |
| 5,998,928 A | 12/1999 | Hipp | |
| 6,000,807 A * | 12/1999 | Moreland | H01H 9/18 |
| | | | 307/66 |
| 6,007,209 A | 12/1999 | Pelka | |
| 6,008,783 A | 12/1999 | Kitagawa et al. | |
| 6,010,228 A * | 1/2000 | Blackman | F21S 9/022 |
| | | | 362/20 |
| 6,011,691 A | 1/2000 | Schreffler | |
| 6,016,038 A | 1/2000 | Mueller et al. | |
| 6,018,237 A | 1/2000 | Havel | |
| 6,019,493 A | 2/2000 | Kuo et al. | |
| 6,020,825 A | 2/2000 | Chansky et al. | |
| 6,025,550 A | 2/2000 | Kato | |
| 6,028,694 A | 2/2000 | Schmidt | |
| 6,030,099 A | 2/2000 | McDermott | |
| 6,031,343 A | 2/2000 | Recknagel et al. | |
| D422,737 S | 4/2000 | Orozco | |
| 6,056,420 A | 5/2000 | Wilson et al. | |
| 6,068,383 A | 5/2000 | Robertson et al. | |
| 6,069,597 A | 5/2000 | Hansen | |
| 6,072,280 A | 6/2000 | Allen | |
| 6,074,074 A | 6/2000 | Marcus | |
| 6,084,359 A | 7/2000 | Hetzel et al. | |
| 6,086,220 A | 7/2000 | Lash et al. | |
| 6,091,200 A | 7/2000 | Lenz | |
| 6,092,915 A | 7/2000 | Rensch | |
| 6,095,661 A | 8/2000 | Lebens et al. | |
| 6,097,352 A | 8/2000 | Zavracky et al. | |
| 6,107,755 A | 8/2000 | Katyl et al. | |
| 6,116,748 A | 9/2000 | George | |
| 6,121,875 A | 9/2000 | Hamm et al. | |
| 6,127,783 A | 10/2000 | Pashley et al. | |
| 6,132,072 A | 10/2000 | Turnbull et al. | |
| 6,135,604 A | 10/2000 | Lin | |
| 6,135,620 A | 10/2000 | Marsh | |
| 6,139,174 A | 10/2000 | Butterworth | |
| 6,149,283 A | 11/2000 | Conway et al. | |
| 6,150,774 A | 11/2000 | Mueller et al. | |
| 6,151,529 A | 11/2000 | Batko | |
| 6,153,985 A | 11/2000 | Grossman | |
| 6,158,882 A | 12/2000 | Bischoff, Jr. | |
| 6,166,496 A | 12/2000 | Lys et al. | |
| 6,175,201 B1 | 1/2001 | Sid | |
| 6,175,220 B1 | 1/2001 | Billig et al. | |
| 6,181,126 B1 | 1/2001 | Havel | |
| D437,947 S | 2/2001 | Huang | |
| 6,183,086 B1 | 2/2001 | Neubert | |
| 6,183,104 B1 | 2/2001 | Ferrara | |
| 6,184,628 B1 | 2/2001 | Ruthenberg | |
| 6,196,471 B1 | 3/2001 | Ruthenberg | |
| 6,203,180 B1 | 3/2001 | Fleischmann | |
| 6,211,626 B1 | 4/2001 | Lys et al. | |
| 6,215,409 B1 | 4/2001 | Blach | |
| 6,217,190 B1 | 4/2001 | Altman et al. | |
| 6,219,239 B1 | 4/2001 | Mellberg et al. | |
| 6,220,722 B1 | 4/2001 | Begemann | |
| 6,227,679 B1 | 5/2001 | Zhang et al. | |
| 6,238,075 B1 | 5/2001 | Dealey, Jr. et al. | |
| 6,241,359 B1 | 6/2001 | Lin | |
| 6,249,221 B1 * | 6/2001 | Reed | G08B 1/08 |
| | | | 340/286.05 |
| 6,250,774 B1 | 6/2001 | Begemann et al. | |
| 6,252,350 B1 | 6/2001 | Alvarez | |
| 6,252,358 B1 | 6/2001 | Xydis et al. | |
| 6,268,600 B1 | 7/2001 | Nakamura et al. | |
| 6,273,338 B1 | 8/2001 | White | |
| 6,275,397 B1 | 8/2001 | McClain | |
| 6,283,612 B1 | 9/2001 | Hunter | |
| 6,290,140 B1 | 9/2001 | Pesko et al. | |
| 6,292,901 B1 | 9/2001 | Lys et al. | |
| 6,293,684 B1 | 9/2001 | Riblett | |
| 6,297,724 B1 | 10/2001 | Bryans et al. | |
| 6,305,109 B1 | 10/2001 | Lee | |
| 6,305,821 B1 | 10/2001 | Hsieh et al. | |
| 6,307,331 B1 | 10/2001 | Bonasia et al. | |
| 6,310,590 B1 | 10/2001 | Havel | |
| 6,315,429 B1 | 11/2001 | Grandolfo | |
| 6,323,832 B1 | 11/2001 | Nishizawa et al. | |
| 6,325,651 B1 | 12/2001 | Nishihara et al. | |
| 6,334,699 B1 | 1/2002 | Gladnick | |
| 6,340,868 B1 | 1/2002 | Lys et al. | |
| 6,354,714 B1 | 3/2002 | Rhodes | |
| 6,361,186 B1 | 3/2002 | Slayden | |
| 6,362,578 B1 | 3/2002 | Swanson et al. | |
| 6,369,525 B1 | 4/2002 | Chang et al. | |
| 6,371,637 B1 | 4/2002 | Atchinson et al. | |
| 6,373,733 B1 | 4/2002 | Wu et al. | |
| 6,379,022 B1 | 4/2002 | Amerson et al. | |
| D457,667 S | 5/2002 | Piepgras et al. | |
| D457,669 S | 5/2002 | Piepgras et al. | |
| D457,974 S | 5/2002 | Piepgras et al. | |
| 6,388,393 B1 | 5/2002 | Illingworth | |
| 6,388,396 B1 | 5/2002 | Katyl et al. | |
| 6,394,623 B1 | 5/2002 | Tsui | |
| 6,396,216 B1 | 5/2002 | Noone et al. | |
| D458,395 S | 6/2002 | Piepgras et al. | |
| 6,400,096 B1 | 6/2002 | Wells et al. | |
| 6,404,131 B1 | 6/2002 | Kawano et al. | |
| 6,411,022 B1 | 6/2002 | Machida | |
| 6,411,045 B1 | 6/2002 | Nerone | |
| 6,422,716 B2 | 7/2002 | Henrici et al. | |
| 6,428,189 B1 | 8/2002 | Hochstein | |
| 6,429,604 B1 | 8/2002 | Chang | |
| D463,610 S | 9/2002 | Piepgras et al. | |
| 6,445,139 B1 | 9/2002 | Marshall et al. | |
| 6,448,550 B1 | 9/2002 | Nishimura | |
| 6,448,716 B1 | 9/2002 | Hutchison | |
| 6,459,919 B1 | 10/2002 | Lys et al. | |
| 6,464,373 B1 | 10/2002 | Petrick | |
| 6,469,457 B2 | 10/2002 | Callahan | |

(56) References Cited

U.S. PATENT DOCUMENTS

| | | |
|---|---|---|
| 6,471,388 B1 | 10/2002 | Marsh |
| 6,472,823 B2 | 10/2002 | Yen |
| 6,473,002 B1 | 10/2002 | Hutchison |
| D468,035 S | 12/2002 | Blanc et al. |
| 6,488,392 B1 | 12/2002 | Lu |
| 6,495,964 B1 | 12/2002 | Muthu et al. |
| 6,511,204 B2 | 1/2003 | Emmel et al. |
| 6,517,218 B2 | 2/2003 | Hochstein |
| 6,521,879 B1 | 2/2003 | Rand et al. |
| 6,522,078 B1 | 2/2003 | Okamoto et al. |
| 6,527,411 B1 | 3/2003 | Sayers |
| 6,528,954 B1 | 3/2003 | Lys et al. |
| 6,528,958 B2 | 3/2003 | Hulshof et al. |
| 6,538,375 B1 | 3/2003 | Duggal et al. |
| 6,540,381 B1 | 4/2003 | Douglass, II |
| 6,541,800 B2 | 4/2003 | Barnett et al. |
| 6,548,967 B1 | 4/2003 | Dowling et al. |
| 6,568,834 B1 | 5/2003 | Scianna |
| 6,573,536 B1 | 6/2003 | Dry |
| 6,577,072 B2 | 6/2003 | Saito et al. |
| 6,577,080 B2 | 6/2003 | Lys et al. |
| 6,577,512 B2 | 6/2003 | Tripathi et al. |
| 6,577,794 B1 | 6/2003 | Currie et al. |
| 6,578,979 B2 | 6/2003 | Truttmann-Battig |
| 6,582,103 B1 | 6/2003 | Popovich et al. |
| 6,583,550 B2 | 6/2003 | Iwasa et al. |
| 6,583,573 B2 | 6/2003 | Bierman |
| D477,093 S | 7/2003 | Moriyama et al. |
| 6,585,393 B1 | 7/2003 | Brandes et al. |
| 6,586,890 B2 | 7/2003 | Min et al. |
| 6,587,049 B1 | 7/2003 | Thacker |
| 6,590,343 B2 | 7/2003 | Pederson |
| 6,592,238 B2 | 7/2003 | Cleaver et al. |
| 6,594,369 B1 | 7/2003 | Une |
| 6,596,977 B2 | 7/2003 | Muthu et al. |
| 6,598,996 B1 | 7/2003 | Lodhie |
| 6,608,453 B2 | 8/2003 | Morgan et al. |
| 6,608,614 B1 | 8/2003 | Johnson |
| 6,609,804 B2 | 8/2003 | Nolan et al. |
| 6,609,813 B1 | 8/2003 | Showers et al. |
| 6,612,712 B2 | 9/2003 | Nepil |
| 6,612,717 B2 | 9/2003 | Yen |
| 6,612,729 B1 | 9/2003 | Hoffman |
| 6,621,222 B1 | 9/2003 | Hong |
| 6,623,151 B2 | 9/2003 | Pederson |
| 6,624,597 B2 | 9/2003 | Dowling et al. |
| D481,484 S | 10/2003 | Cuevas et al. |
| 6,634,770 B2 | 10/2003 | Cao |
| 6,634,779 B2 | 10/2003 | Reed |
| 6,636,003 B2 | 10/2003 | Rahm et al. |
| 6,639,349 B1 | 10/2003 | Bahadur |
| 6,641,284 B2 | 11/2003 | Stopa et al. |
| 6,652,117 B2 | 11/2003 | Tsai |
| 6,659,622 B2 | 12/2003 | Katogi et al. |
| 6,660,935 B2 | 12/2003 | Southard et al. |
| 6,666,689 B1 | 12/2003 | Savage, Jr. |
| 6,667,623 B2 | 12/2003 | Bourgault et al. |
| 6,674,096 B2 | 1/2004 | Sommers |
| 6,676,284 B1 | 1/2004 | Wynne Willson |
| 6,679,621 B2 | 1/2004 | West et al. |
| 6,681,154 B2 | 1/2004 | Nierlich et al. |
| 6,682,205 B2 | 1/2004 | Lin |
| 6,683,419 B2 | 1/2004 | Kriparos |
| 6,700,136 B2 | 3/2004 | Guida |
| 6,712,486 B1 | 3/2004 | Popovich et al. |
| 6,717,376 B2 | 4/2004 | Lys et al. |
| 6,717,526 B2 | 4/2004 | Martineau et al. |
| 6,720,745 B2 | 4/2004 | Lys et al. |
| 6,726,348 B2 | 4/2004 | Gloisten |
| 6,736,328 B1 | 5/2004 | Takusagawa |
| 6,736,525 B2 | 5/2004 | Chin |
| 6,741,324 B1 | 5/2004 | Kim |
| D491,678 S | 6/2004 | Piepgras |
| D492,042 S | 6/2004 | Piepgras |
| 6,744,223 B2 | 6/2004 | Laflamme et al. |
| 6,748,299 B1 | 6/2004 | Motoyama |
| 6,762,562 B2 | 7/2004 | Leong |
| 6,768,047 B2 | 7/2004 | Chang et al. |
| 6,774,584 B2 | 8/2004 | Lys et al. |
| 6,777,891 B2 | 8/2004 | Lys et al. |
| 6,781,329 B2 | 8/2004 | Mueller et al. |
| 6,787,999 B2 | 9/2004 | Stimac et al. |
| 6,788,000 B2 | 9/2004 | Appelberg et al. |
| 6,788,011 B2 | 9/2004 | Mueller et al. |
| 6,791,840 B2 | 9/2004 | Chun |
| 6,796,680 B1 | 9/2004 | Showers et al. |
| 6,799,864 B2 | 10/2004 | Bohler et al. |
| 6,801,003 B2 | 10/2004 | Schanberger et al. |
| 6,803,732 B2 | 10/2004 | Kraus et al. |
| 6,806,659 B1 | 10/2004 | Mueller et al. |
| 6,814,470 B2 | 11/2004 | Rizkin et al. |
| 6,814,478 B2 | 11/2004 | Menke |
| 6,815,724 B2 | 11/2004 | Dry |
| 6,846,094 B2 | 1/2005 | Luk |
| 6,851,816 B2 | 2/2005 | Wu et al. |
| 6,851,832 B2 | 2/2005 | Tieszen |
| 6,853,150 B2 | 2/2005 | Clauberg et al. |
| 6,853,151 B2 | 2/2005 | Leong et al. |
| 6,853,563 B1 | 2/2005 | Yang et al. |
| 6,857,924 B2 | 2/2005 | Fu et al. |
| 6,860,628 B2 | 3/2005 | Robertson et al. |
| 6,866,401 B2 | 3/2005 | Sommers et al. |
| 6,869,204 B2 | 3/2005 | Morgan et al. |
| 6,871,981 B2 | 3/2005 | Alexanderson et al. |
| 6,874,924 B1 | 4/2005 | Hulse et al. |
| 6,879,883 B1 | 4/2005 | Motoyama |
| 6,882,111 B2 | 4/2005 | Kan et al. |
| 6,883,929 B2 | 4/2005 | Dowling |
| 6,883,934 B2 | 4/2005 | Kawakami et al. |
| 6,888,322 B2 | 5/2005 | Dowling et al. |
| 6,897,624 B2 | 5/2005 | Lys et al. |
| D506,274 S | 6/2005 | Moriyama et al. |
| 6,909,239 B2 | 6/2005 | Gauna |
| 6,909,921 B1 | 6/2005 | Bilger |
| 6,918,680 B2 | 7/2005 | Seeberger |
| 6,921,181 B2 | 7/2005 | Yen |
| 6,926,419 B2 | 8/2005 | An |
| 6,936,968 B2 | 8/2005 | Cross et al. |
| 6,936,978 B2 | 8/2005 | Morgan et al. |
| 6,940,230 B2 | 9/2005 | Myron et al. |
| 6,948,829 B2 | 9/2005 | Verdes et al. |
| 6,953,261 B1 | 10/2005 | Jiao et al. |
| 6,957,905 B1 | 10/2005 | Pritchard et al. |
| 6,963,175 B2 | 11/2005 | Archenhold et al. |
| 6,964,501 B2 | 11/2005 | Ryan |
| 6,965,197 B2 | 11/2005 | Tyan et al. |
| 6,965,205 B2 | 11/2005 | Piepgras et al. |
| 6,967,448 B2 | 11/2005 | Morgan et al. |
| 6,969,179 B2 | 11/2005 | Sloan et al. |
| 6,969,186 B2 | 11/2005 | Sonderegger et al. |
| 6,969,954 B2 | 11/2005 | Lys |
| 6,975,079 B2 | 12/2005 | Lys et al. |
| 6,979,097 B2 | 12/2005 | Elam et al. |
| 6,982,518 B2 | 1/2006 | Chou et al. |
| 6,995,681 B2 | 2/2006 | Pederson |
| 6,997,576 B1 | 2/2006 | Lodhie et al. |
| 6,999,318 B2 | 2/2006 | Newby |
| 7,004,603 B2 | 2/2006 | Knight |
| D518,218 S | 3/2006 | Roberge et al. |
| 7,008,079 B2 | 3/2006 | Smith |
| 7,014,336 B1 | 3/2006 | Ducharme et al. |
| 7,015,650 B2 | 3/2006 | McGrath |
| 7,018,063 B2 | 3/2006 | Michael et al. |
| 7,018,074 B2 | 3/2006 | Raby et al. |
| 7,021,799 B2 | 4/2006 | Mizuyoshi |
| 7,021,809 B2 | 4/2006 | Iwasa et al. |
| 7,024,256 B2 | 4/2006 | Krzyzanowski et al. |
| 7,029,145 B2 | 4/2006 | Frederick |
| 7,031,920 B2 | 4/2006 | Dowling et al. |
| 7,033,036 B2 | 4/2006 | Pederson |
| 7,038,398 B1 | 5/2006 | Lys et al. |
| 7,038,399 B2 | 5/2006 | Lys et al. |
| 7,042,172 B2 | 5/2006 | Dowling et al. |
| 7,048,423 B2 | 5/2006 | Stepanenko et al. |

(56) References Cited

U.S. PATENT DOCUMENTS

| | | | |
|---|---|---|---|
| 7,049,761 B2 * | 5/2006 | Timmermans | F21K 9/17 257/E25.028 |
| 7,052,171 B1 | 5/2006 | Lefebvre et al. | |
| 7,053,557 B2 | 5/2006 | Cross et al. | |
| 7,064,498 B2 | 6/2006 | Dowling et al. | |
| 7,064,674 B2 | 6/2006 | Pederson | |
| 7,067,992 B2 | 6/2006 | Leong et al. | |
| 7,077,978 B2 | 7/2006 | Setlur et al. | |
| 7,080,927 B2 | 7/2006 | Feuerborn et al. | |
| 7,086,747 B2 | 8/2006 | Nielson et al. | |
| 7,088,014 B2 | 8/2006 | Nierlich et al. | |
| 7,088,904 B2 | 8/2006 | Ryan, Jr. | |
| 7,102,902 B1 | 9/2006 | Brown et al. | |
| 7,113,541 B1 | 9/2006 | Lys et al. | |
| 7,114,830 B2 | 10/2006 | Robertson et al. | |
| 7,114,834 B2 | 10/2006 | Rivas et al. | |
| 7,118,262 B2 | 10/2006 | Negley | |
| 7,119,503 B2 | 10/2006 | Kemper | |
| 7,120,560 B2 | 10/2006 | Williams et al. | |
| 7,121,679 B2 | 10/2006 | Fujimoto | |
| 7,122,976 B1 | 10/2006 | Null et al. | |
| 7,123,139 B2 | 10/2006 | Sweeney | |
| 7,128,442 B2 | 10/2006 | Lee et al. | |
| 7,128,454 B2 | 10/2006 | Kim et al. | |
| D532,532 S | 11/2006 | Maxik | |
| 7,132,635 B2 | 11/2006 | Dowling | |
| 7,132,785 B2 | 11/2006 | Ducharme | |
| 7,132,804 B2 | 11/2006 | Lys et al. | |
| 7,135,824 B2 | 11/2006 | Lys et al. | |
| 7,139,617 B1 | 11/2006 | Morgan et al. | |
| 7,144,135 B2 | 12/2006 | Martin et al. | |
| 7,153,002 B2 | 12/2006 | Kim et al. | |
| 7,161,311 B2 | 1/2007 | Mueller et al. | |
| 7,161,313 B2 | 1/2007 | Piepgras et al. | |
| 7,161,556 B2 | 1/2007 | Morgan et al. | |
| 7,164,110 B2 | 1/2007 | Pitigoi-Aron et al. | |
| 7,164,235 B2 | 1/2007 | Ito et al. | |
| 7,165,863 B1 | 1/2007 | Thomas et al. | |
| 7,165,866 B2 | 1/2007 | Li | |
| 7,167,777 B2 | 1/2007 | Budike, Jr. | |
| 7,168,843 B2 | 1/2007 | Striebel | |
| D536,468 S | 2/2007 | Crosby | |
| 7,178,941 B2 | 2/2007 | Roberge et al. | |
| 7,180,252 B2 | 2/2007 | Lys et al. | |
| D538,950 S | 3/2007 | Maxik | |
| D538,952 S | 3/2007 | Maxik et al. | |
| D538,962 S | 3/2007 | Elliott | |
| 7,186,003 B2 | 3/2007 | Dowling et al. | |
| 7,186,005 B2 | 3/2007 | Hulse | |
| 7,187,141 B2 | 3/2007 | Mueller et al. | |
| 7,190,126 B1 | 3/2007 | Paton | |
| 7,192,154 B2 | 3/2007 | Becker | |
| 7,198,387 B1 | 4/2007 | Gloisten et al. | |
| 7,201,491 B2 | 4/2007 | Bayat et al. | |
| 7,201,497 B2 | 4/2007 | Weaver, Jr. et al. | |
| 7,202,613 B2 | 4/2007 | Morgan et al. | |
| 7,204,615 B2 | 4/2007 | Arik et al. | |
| 7,204,622 B2 | 4/2007 | Dowling et al. | |
| 7,207,696 B1 | 4/2007 | Lin | |
| 7,210,818 B2 | 5/2007 | Luk et al. | |
| 7,210,957 B2 | 5/2007 | Mrakovich et al. | |
| 7,211,959 B1 | 5/2007 | Chou | |
| 7,213,934 B2 | 5/2007 | Zarian et al. | |
| 7,217,004 B2 | 5/2007 | Park et al. | |
| 7,217,012 B2 | 5/2007 | Southard et al. | |
| 7,217,022 B2 | 5/2007 | Ruffin | |
| 7,218,056 B1 * | 5/2007 | Harwood | G08B 7/066 307/66 |
| 7,218,238 B2 | 5/2007 | Right et al. | |
| 7,220,015 B2 | 5/2007 | Dowling | |
| 7,220,018 B2 | 5/2007 | Crabb et al. | |
| 7,221,104 B2 | 5/2007 | Lys et al. | |
| 7,221,110 B2 | 5/2007 | Sears et al. | |
| 7,224,000 B2 | 5/2007 | Aanegola et al. | |
| 7,226,189 B2 | 6/2007 | Lee et al. | |
| 7,228,052 B1 | 6/2007 | Lin | |
| 7,228,190 B2 | 6/2007 | Dowling et al. | |
| 7,231,060 B2 | 6/2007 | Dowling et al. | |
| 7,233,115 B2 | 6/2007 | Lys | |
| 7,233,831 B2 | 6/2007 | Blackwell | |
| 7,236,366 B2 | 6/2007 | Chen | |
| 7,237,924 B2 | 7/2007 | Martineau et al. | |
| 7,237,925 B2 | 7/2007 | Mayer et al. | |
| 7,239,532 B1 | 7/2007 | Hsu et al. | |
| 7,241,038 B2 | 7/2007 | Naniwa et al. | |
| 7,242,152 B2 | 7/2007 | Dowling et al. | |
| 7,244,058 B2 | 7/2007 | DiPenti et al. | |
| 7,246,926 B2 | 7/2007 | Harwood | |
| 7,246,931 B2 | 7/2007 | Hsieh et al. | |
| 7,248,239 B2 | 7/2007 | Dowling et al. | |
| 7,249,269 B1 | 7/2007 | Motoyama | |
| 7,249,865 B2 | 7/2007 | Robertson | |
| D548,868 S | 8/2007 | Roberge et al. | |
| 7,252,408 B2 | 8/2007 | Mazzochette et al. | |
| 7,253,566 B2 | 8/2007 | Lys et al. | |
| 7,255,457 B2 | 8/2007 | Ducharme et al. | |
| 7,255,460 B2 | 8/2007 | Lee | |
| 7,256,554 B2 | 8/2007 | Lys | |
| 7,258,458 B2 | 8/2007 | Mochiachvili et al. | |
| 7,258,467 B2 | 8/2007 | Saccomanno et al. | |
| 7,259,528 B2 | 8/2007 | Pilz | |
| 7,262,439 B2 | 8/2007 | Setlur et al. | |
| 7,262,559 B2 | 8/2007 | Tripathi et al. | |
| D550,379 S | 9/2007 | Hoshikawa et al. | |
| 7,264,372 B2 | 9/2007 | Maglica | |
| 7,267,467 B2 | 9/2007 | Wu et al. | |
| 7,270,443 B2 | 9/2007 | Kurtz et al. | |
| 7,271,794 B1 | 9/2007 | Cheng et al. | |
| 7,273,300 B2 | 9/2007 | Mrakovich | |
| 7,274,045 B2 | 9/2007 | Chandran et al. | |
| 7,274,160 B2 | 9/2007 | Mueller et al. | |
| D553,267 S | 10/2007 | Yuen | |
| 7,285,801 B2 | 10/2007 | Eliashevich et al. | |
| 7,288,902 B1 | 10/2007 | Melanson | |
| 7,288,904 B2 | 10/2007 | Numeroli et al. | |
| 7,296,912 B2 | 11/2007 | Beauchamp | |
| 7,300,184 B2 | 11/2007 | Ichikawa et al. | |
| 7,300,192 B2 | 11/2007 | Mueller et al. | |
| D556,937 S | 12/2007 | Ly | |
| D557,854 S | 12/2007 | Lewis | |
| 7,303,300 B2 | 12/2007 | Dowling et al. | |
| 7,306,353 B2 | 12/2007 | Popovich et al. | |
| 7,307,391 B2 | 12/2007 | Shan | |
| 7,308,296 B2 | 12/2007 | Lys et al. | |
| 7,309,965 B2 | 12/2007 | Dowling et al. | |
| 7,318,658 B2 | 1/2008 | Wang et al. | |
| 7,319,244 B2 | 1/2008 | Liu et al. | |
| 7,319,246 B2 | 1/2008 | Soules et al. | |
| 7,321,191 B2 | 1/2008 | Setlur et al. | |
| 7,326,964 B2 | 2/2008 | Lim et al. | |
| 7,327,281 B2 | 2/2008 | Hutchison | |
| 7,329,024 B2 | 2/2008 | Lynch et al. | |
| 7,329,031 B2 | 2/2008 | Liaw et al. | |
| D563,589 S | 3/2008 | Hariri et al. | |
| 7,344,278 B2 | 3/2008 | Paravantsos | |
| 7,345,320 B2 | 3/2008 | Dahm | |
| 7,348,604 B2 | 3/2008 | Matheson | |
| 7,350,936 B2 | 4/2008 | Ducharme et al. | |
| 7,350,952 B2 | 4/2008 | Nishigaki | |
| 7,352,138 B2 | 4/2008 | Lys et al. | |
| 7,352,339 B2 | 4/2008 | Morgan et al. | |
| 7,353,071 B2 | 4/2008 | Blackwell et al. | |
| 7,357,530 B2 * | 4/2008 | Wang | B64F 1/20 362/249.01 |
| 7,358,679 B2 | 4/2008 | Lys et al. | |
| 7,358,929 B2 | 4/2008 | Mueller et al. | |
| 7,370,986 B2 | 5/2008 | Chan | |
| 7,374,327 B2 * | 5/2008 | Schexnaider | F21S 8/04 362/394 |
| 7,378,805 B2 | 5/2008 | Oh et al. | |
| 7,378,976 B1 | 5/2008 | Paterno | |
| 7,385,359 B2 | 6/2008 | Dowling et al. | |
| 7,391,159 B2 | 6/2008 | Harwood | |
| D574,093 S | 7/2008 | Kitagawa et al. | |

(56) References Cited

U.S. PATENT DOCUMENTS

| | | | |
|---|---|---|---|
| 7,396,142 B2 | 7/2008 | Laizure, Jr. et al. | |
| 7,396,146 B2 | 7/2008 | Wang | |
| 7,401,935 B2 | 7/2008 | VanderSchuit | |
| 7,401,945 B2 | 7/2008 | Zhang | |
| D576,749 S | 9/2008 | Kitagawa et al. | |
| 7,423,548 B2 * | 9/2008 | Kontovich | G08B 7/066 340/326 |
| 7,427,840 B2 | 9/2008 | Morgan et al. | |
| 7,429,117 B2 | 9/2008 | Pohlert et al. | |
| 7,434,964 B1 | 10/2008 | Zheng et al. | |
| 7,438,441 B2 | 10/2008 | Sun et al. | |
| D580,089 S | 11/2008 | Ly et al. | |
| D581,556 S | 11/2008 | To et al. | |
| 7,449,847 B2 | 11/2008 | Schanberger et al. | |
| D582,577 S | 12/2008 | Yuen | |
| 7,466,082 B1 | 12/2008 | Snyder et al. | |
| 7,470,046 B2 | 12/2008 | Kao et al. | |
| D584,428 S | 1/2009 | Li et al. | |
| D584,429 S | 1/2009 | Pei et al. | |
| 7,476,002 B2 | 1/2009 | Wolf et al. | |
| 7,476,004 B2 | 1/2009 | Chan | |
| 7,478,924 B2 | 1/2009 | Robertson | |
| 7,482,764 B2 | 1/2009 | Morgan et al. | |
| D586,484 S | 2/2009 | Liu et al. | |
| D586,928 S | 2/2009 | Liu et al. | |
| 7,490,957 B2 | 2/2009 | Leong et al. | |
| 7,494,246 B2 | 2/2009 | Harbers et al. | |
| 7,497,596 B2 | 3/2009 | Ge | |
| 7,498,753 B2 | 3/2009 | McAvoy et al. | |
| 7,507,001 B2 | 3/2009 | Kit | |
| 7,510,299 B2 | 3/2009 | Timmermans et al. | |
| 7,510,400 B2 | 3/2009 | Glovatsky et al. | |
| 7,511,613 B2 | 3/2009 | Wang | |
| 7,514,876 B2 | 4/2009 | Roach, Jr. | |
| 7,520,635 B2 | 4/2009 | Wolf et al. | |
| 7,521,872 B2 | 4/2009 | Bruning | |
| 7,524,089 B2 | 4/2009 | Park | |
| D592,766 S | 5/2009 | Zhu et al. | |
| D593,223 S | 5/2009 | Komar | |
| 7,530,701 B2 | 5/2009 | Chan-Wing | |
| 7,534,002 B2 | 5/2009 | Yamaguchi et al. | |
| D594,999 S | 6/2009 | Uchida et al. | |
| 7,549,769 B2 | 6/2009 | Kim et al. | |
| 7,556,396 B2 | 7/2009 | Kuo et al. | |
| 7,559,663 B2 | 7/2009 | Wong et al. | |
| 7,562,998 B1 | 7/2009 | Yen | |
| D597,686 S | 8/2009 | Noh | |
| 7,569,981 B1 | 8/2009 | Ciancanelli | |
| 7,572,030 B2 | 8/2009 | Booth et al. | |
| 7,575,339 B2 | 8/2009 | Hung | |
| 7,579,786 B2 | 8/2009 | Soos | |
| 7,583,035 B2 | 9/2009 | Shteynberg et al. | |
| 7,583,901 B2 | 9/2009 | Nakagawa et al. | |
| 7,592,757 B2 | 9/2009 | Hargenrader et al. | |
| 7,594,738 B1 | 9/2009 | Lin et al. | |
| D601,726 S | 10/2009 | Mollaert et al. | |
| 7,598,681 B2 | 10/2009 | Lys et al. | |
| 7,598,684 B2 | 10/2009 | Lys et al. | |
| 7,600,907 B2 | 10/2009 | Liu et al. | |
| 7,602,559 B2 | 10/2009 | Jang et al. | |
| 7,616,849 B1 | 11/2009 | Simon | |
| 7,618,157 B1 | 11/2009 | Galvez et al. | |
| 7,619,366 B2 | 11/2009 | Diederiks | |
| 7,626,507 B2 * | 12/2009 | LaCasse | G08B 7/062 340/577 |
| 7,635,201 B2 | 12/2009 | Deng | |
| 7,635,214 B2 | 12/2009 | Perlo | |
| 7,639,517 B2 | 12/2009 | Zhou et al. | |
| 7,648,251 B2 | 1/2010 | Whitehouse et al. | |
| D610,724 S | 2/2010 | Chiang et al. | |
| 7,654,703 B2 | 2/2010 | Kan et al. | |
| 7,661,839 B2 | 2/2010 | Tsai | |
| D611,172 S | 3/2010 | Lin et al. | |
| D612,528 S | 3/2010 | McGrath et al. | |
| 7,690,813 B2 | 4/2010 | Kanamori et al. | |
| 7,710,047 B2 | 5/2010 | Shteynberg et al. | |
| 7,710,253 B1 | 5/2010 | Fredricks | |
| 7,712,918 B2 | 5/2010 | Siemiet et al. | |
| 7,748,886 B2 | 7/2010 | Pazula et al. | |
| 7,758,207 B1 | 7/2010 | Zhou et al. | |
| 7,759,881 B1 | 7/2010 | Melanson | |
| D621,975 S | 8/2010 | Wang | |
| 7,784,966 B2 | 8/2010 | Verfuerth et al. | |
| 7,800,511 B1 * | 9/2010 | Hutchison | G08B 7/066 340/3.1 |
| 7,815,338 B2 | 10/2010 | Siemiet et al. | |
| 7,815,341 B2 | 10/2010 | Steedly et al. | |
| 7,828,471 B2 | 11/2010 | Lin | |
| 7,843,150 B2 | 11/2010 | Wang et al. | |
| 7,848,702 B2 * | 12/2010 | Ho | H02J 9/02 455/11.1 |
| 7,850,341 B2 | 12/2010 | Mrakovich et al. | |
| 7,855,641 B1 | 12/2010 | Okafo | |
| RE42,161 E | 2/2011 | Hochstein | |
| 7,878,683 B2 | 2/2011 | Logan et al. | |
| 7,887,216 B2 | 2/2011 | Patrick | |
| 7,887,226 B2 | 2/2011 | Huang et al. | |
| D634,452 S | 3/2011 | de Visser | |
| 7,904,209 B2 | 3/2011 | Podgorny et al. | |
| D636,504 S | 4/2011 | Duster | |
| 7,926,975 B2 | 4/2011 | Siemiet et al. | |
| 7,938,562 B2 | 5/2011 | Ivey et al. | |
| 7,946,729 B2 | 5/2011 | Ivey et al. | |
| 7,976,185 B2 | 7/2011 | Uang et al. | |
| 7,976,196 B2 | 7/2011 | Ivey et al. | |
| 7,990,070 B2 | 8/2011 | Nerone | |
| 7,997,770 B1 | 8/2011 | Meurer | |
| 8,013,472 B2 | 9/2011 | Adest et al. | |
| D650,097 S | 12/2011 | Trumble et al. | |
| D650,494 S | 12/2011 | Tsao et al. | |
| D652,968 S | 1/2012 | Aguiar et al. | |
| 8,093,823 B1 | 1/2012 | Ivey et al. | |
| D654,192 S | 2/2012 | Maxik et al. | |
| 8,118,447 B2 | 2/2012 | Simon et al. | |
| 8,136,738 B2 | 3/2012 | Kopp | |
| 8,159,152 B1 | 4/2012 | Salessi | |
| D660,472 S | 5/2012 | Aguiar et al. | |
| 8,167,452 B2 | 5/2012 | Chou | |
| 8,177,388 B2 | 5/2012 | Yen | |
| 8,179,037 B2 | 5/2012 | Chan et al. | |
| 8,183,989 B2 * | 5/2012 | Tsai | G08B 7/066 340/326 |
| D662,236 S | 6/2012 | Matsushita | |
| 8,203,445 B2 | 6/2012 | Recker et al. | |
| 8,214,084 B2 | 7/2012 | Ivey et al. | |
| 8,230,690 B1 | 7/2012 | Salessi | |
| 8,247,985 B2 | 8/2012 | Timmermans et al. | |
| 8,251,544 B2 | 8/2012 | Ivey et al. | |
| 8,262,249 B2 | 9/2012 | Hsia et al. | |
| 8,272,764 B2 | 9/2012 | Son | |
| 8,287,144 B2 | 10/2012 | Pedersen et al. | |
| 8,297,788 B2 | 10/2012 | Bishop | |
| 8,299,722 B2 | 10/2012 | Melanson | |
| 8,304,993 B2 | 11/2012 | Tzou et al. | |
| 8,313,213 B2 | 11/2012 | Lin et al. | |
| 8,319,407 B2 | 11/2012 | Ke | |
| 8,319,433 B2 | 11/2012 | Lin et al. | |
| 8,319,437 B2 | 11/2012 | Carlin et al. | |
| 8,322,878 B2 | 12/2012 | Hsia et al. | |
| 8,324,817 B2 | 12/2012 | Ivey et al. | |
| 8,337,071 B2 | 12/2012 | Negley et al. | |
| 8,366,291 B2 | 2/2013 | Hoffmann | |
| 8,376,579 B2 | 2/2013 | Chang | |
| 8,376,588 B2 | 2/2013 | Yen | |
| 8,382,322 B2 | 2/2013 | Bishop | |
| 8,382,327 B2 * | 2/2013 | Timmermans | F21K 9/17 315/224 |
| 8,382,502 B2 | 2/2013 | Cao et al. | |
| 8,398,275 B2 | 3/2013 | Wang et al. | |
| 8,403,692 B2 | 3/2013 | Cao et al. | |
| 8,405,314 B2 | 3/2013 | Jensen | |
| 8,434,914 B2 | 5/2013 | Li et al. | |
| 8,454,193 B2 | 6/2013 | Simon et al. | |
| 8,496,351 B2 | 7/2013 | Lo et al. | |

(56) References Cited

U.S. PATENT DOCUMENTS

| | | |
|---|---|---|
| 8,523,394 B2 | 9/2013 | Simon et al. |
| 8,531,109 B2 | 9/2013 | Visser et al. |
| 8,571,716 B2 | 10/2013 | Ivey et al. |
| 8,628,216 B2 | 1/2014 | Ivey et al. |
| 8,653,984 B2 | 2/2014 | Ivey et al. |
| 8,870,412 B1 | 10/2014 | Timmermans et al. |
| 9,016,895 B2 | 4/2015 | Handsaker |
| 2001/0033488 A1 | 10/2001 | Chliwnyj et al. |
| 2001/0045803 A1 | 11/2001 | Cencur |
| 2002/0011801 A1 | 1/2002 | Chang |
| 2002/0015297 A1 | 2/2002 | Hayashi et al. |
| 2002/0038157 A1 | 3/2002 | Dowling et al. |
| 2002/0041159 A1 | 4/2002 | Kaping, Jr. |
| 2002/0044066 A1 | 4/2002 | Dowling et al. |
| 2002/0047516 A1 | 4/2002 | Iwasa et al. |
| 2002/0047569 A1 | 4/2002 | Dowling et al. |
| 2002/0047624 A1 | 4/2002 | Stam et al. |
| 2002/0047628 A1 | 4/2002 | Morgan et al. |
| 2002/0048169 A1 | 4/2002 | Dowling et al. |
| 2002/0057061 A1 | 5/2002 | Mueller et al. |
| 2002/0060526 A1* | 5/2002 | Timmermans ............ F21K 9/17 315/246 |
| 2002/0070688 A1 | 6/2002 | Dowling et al. |
| 2002/0074559 A1 | 6/2002 | Dowling et al. |
| 2002/0074958 A1* | 6/2002 | Crenshaw ................ H02J 9/02 315/291 |
| 2002/0078221 A1 | 6/2002 | Blackwell et al. |
| 2002/0101197 A1 | 8/2002 | Lys et al. |
| 2002/0113555 A1 | 8/2002 | Lys et al. |
| 2002/0130627 A1 | 9/2002 | Morgan et al. |
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0152298 A1 | 10/2002 | Kikta et al. |
| 2002/0153851 A1 | 10/2002 | Morgan et al. |
| 2002/0158583 A1 | 10/2002 | Lys et al. |
| 2002/0163316 A1 | 11/2002 | Lys et al. |
| 2002/0171365 A1 | 11/2002 | Morgan et al. |
| 2002/0171377 A1 | 11/2002 | Mueller et al. |
| 2002/0171378 A1 | 11/2002 | Morgan et al. |
| 2002/0176253 A1 | 11/2002 | Lee |
| 2002/0176259 A1 | 11/2002 | Ducharme |
| 2002/0179816 A1 | 12/2002 | Haines et al. |
| 2002/0195975 A1 | 12/2002 | Schanberger et al. |
| 2003/0011538 A1 | 1/2003 | Lys et al. |
| 2003/0021117 A1 | 1/2003 | Chan |
| 2003/0028260 A1 | 2/2003 | Blackwell |
| 2003/0031015 A1 | 2/2003 | Ishibashi |
| 2003/0048641 A1* | 3/2003 | Alexanderson ........ B60Q 3/025 362/470 |
| 2003/0052599 A1 | 3/2003 | Sun |
| 2003/0057884 A1 | 3/2003 | Dowling et al. |
| 2003/0057886 A1 | 3/2003 | Lys et al. |
| 2003/0057887 A1 | 3/2003 | Dowling et al. |
| 2003/0057890 A1 | 3/2003 | Lys et al. |
| 2003/0076281 A1 | 4/2003 | Morgan et al. |
| 2003/0085710 A1 | 5/2003 | Bourgault et al. |
| 2003/0095404 A1 | 5/2003 | Becks et al. |
| 2003/0100837 A1 | 5/2003 | Lys et al. |
| 2003/0102810 A1 | 6/2003 | Cross et al. |
| 2003/0133292 A1 | 7/2003 | Mueller et al. |
| 2003/0137258 A1 | 7/2003 | Piepgras et al. |
| 2003/0185005 A1 | 10/2003 | Sommers et al. |
| 2003/0185014 A1 | 10/2003 | Gloisten |
| 2003/0189412 A1 | 10/2003 | Cunningham |
| 2003/0218879 A1 | 11/2003 | Tieszen |
| 2003/0222578 A1 | 12/2003 | Cok |
| 2003/0222587 A1 | 12/2003 | Dowling, Jr. et al. |
| 2003/0234342 A1 | 12/2003 | Gaines et al. |
| 2004/0003545 A1 | 1/2004 | Gillespie |
| 2004/0007980 A1 | 1/2004 | Shibata |
| 2004/0012959 A1 | 1/2004 | Robertson et al. |
| 2004/0036006 A1 | 2/2004 | Dowling |
| 2004/0037088 A1 | 2/2004 | English et al. |
| 2004/0052076 A1 | 3/2004 | Mueller et al. |
| 2004/0062041 A1 | 4/2004 | Cross et al. |
| 2004/0075572 A1 | 4/2004 | Buschmann et al. |
| 2004/0080960 A1 | 4/2004 | Wu |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0105264 A1 | 6/2004 | Spero |
| 2004/0113568 A1 | 6/2004 | Dowling et al. |
| 2004/0114371 A1 | 6/2004 | Lea et al. |
| 2004/0116039 A1 | 6/2004 | Mueller et al. |
| 2004/0124782 A1 | 7/2004 | Yu |
| 2004/0130908 A1 | 7/2004 | McClurg et al. |
| 2004/0130909 A1 | 7/2004 | Mueller et al. |
| 2004/0141321 A1 | 7/2004 | Dowling et al. |
| 2004/0145886 A1 | 7/2004 | Fatemi et al. |
| 2004/0155609 A1 | 8/2004 | Lys et al. |
| 2004/0160199 A1 | 8/2004 | Morgan et al. |
| 2004/0178751 A1 | 9/2004 | Mueller et al. |
| 2004/0189218 A1 | 9/2004 | Leong et al. |
| 2004/0189262 A1 | 9/2004 | McGrath |
| 2004/0212320 A1 | 10/2004 | Dowling et al. |
| 2004/0212321 A1 | 10/2004 | Lys et al. |
| 2004/0212993 A1 | 10/2004 | Morgan et al. |
| 2004/0223328 A1 | 11/2004 | Lee et al. |
| 2004/0240890 A1 | 12/2004 | Lys et al. |
| 2004/0251854 A1 | 12/2004 | Matsuda et al. |
| 2004/0257007 A1 | 12/2004 | Lys et al. |
| 2005/0013133 A1 | 1/2005 | Yeh |
| 2005/0023536 A1 | 2/2005 | Shackle |
| 2005/0024877 A1 | 2/2005 | Frederick |
| 2005/0030744 A1 | 2/2005 | Ducharme et al. |
| 2005/0035728 A1 | 2/2005 | Schanberger et al. |
| 2005/0036300 A1 | 2/2005 | Dowling et al. |
| 2005/0040774 A1 | 2/2005 | Mueller et al. |
| 2005/0041161 A1 | 2/2005 | Dowling et al. |
| 2005/0041424 A1 | 2/2005 | Ducharme |
| 2005/0043907 A1 | 2/2005 | Eckel et al. |
| 2005/0044617 A1 | 3/2005 | Mueller et al. |
| 2005/0047132 A1 | 3/2005 | Dowling et al. |
| 2005/0047134 A1 | 3/2005 | Mueller et al. |
| 2005/0062440 A1 | 3/2005 | Lys et al. |
| 2005/0063194 A1 | 3/2005 | Lys et al. |
| 2005/0078477 A1 | 4/2005 | Lo |
| 2005/0093488 A1 | 5/2005 | Hung et al. |
| 2005/0099824 A1 | 5/2005 | Dowling et al. |
| 2005/0107694 A1 | 5/2005 | Jansen et al. |
| 2005/0110384 A1 | 5/2005 | Peterson |
| 2005/0116667 A1 | 6/2005 | Mueller et al. |
| 2005/0128751 A1 | 6/2005 | Roberge et al. |
| 2005/0141225 A1 | 6/2005 | Striebel |
| 2005/0151489 A1 | 7/2005 | Lys et al. |
| 2005/0151663 A1 | 7/2005 | Tanguay |
| 2005/0154494 A1 | 7/2005 | Ahmed |
| 2005/0162093 A1 | 7/2005 | Timmermans et al. |
| 2005/0162100 A1 | 7/2005 | Romano et al. |
| 2005/0162101 A1 | 7/2005 | Leong et al. |
| 2005/0174473 A1 | 8/2005 | Morgan et al. |
| 2005/0174780 A1 | 8/2005 | Park |
| 2005/0184667 A1 | 8/2005 | Sturman et al. |
| 2005/0184864 A1 | 8/2005 | Picard |
| 2005/0201112 A1 | 9/2005 | Machi et al. |
| 2005/0206529 A1 | 9/2005 | St.-Germain |
| 2005/0213320 A1 | 9/2005 | Kazuhiro et al. |
| 2005/0213352 A1 | 9/2005 | Lys |
| 2005/0213353 A1 | 9/2005 | Lys |
| 2005/0218838 A1 | 10/2005 | Lys |
| 2005/0218870 A1 | 10/2005 | Lys |
| 2005/0219860 A1 | 10/2005 | Schexnaider |
| 2005/0219872 A1 | 10/2005 | Lys |
| 2005/0225979 A1 | 10/2005 | Robertson et al. |
| 2005/0231133 A1 | 10/2005 | Lys |
| 2005/0236029 A1 | 10/2005 | Dowling |
| 2005/0236998 A1 | 10/2005 | Mueller et al. |
| 2005/0242742 A1 | 11/2005 | Cheang et al. |
| 2005/0243577 A1 | 11/2005 | Moon |
| 2005/0248299 A1 | 11/2005 | Chemel et al. |
| 2005/0253533 A1 | 11/2005 | Lys et al. |
| 2005/0259424 A1 | 11/2005 | Zampini, II et al. |
| 2005/0264474 A1 | 12/2005 | Rast |

(56) References Cited

U.S. PATENT DOCUMENTS

| | | |
|---|---|---|
| 2005/0265019 A1 | 12/2005 | Sommers et al. |
| 2005/0275626 A1 | 12/2005 | Mueller et al. |
| 2005/0276051 A1 | 12/2005 | Caudle et al. |
| 2005/0276053 A1 | 12/2005 | Nortrup et al. |
| 2005/0276064 A1 | 12/2005 | Wu et al. |
| 2005/0281030 A1 | 12/2005 | Leong et al. |
| 2005/0285547 A1 | 12/2005 | Piepgras et al. |
| 2006/0002110 A1 | 1/2006 | Dowling et al. |
| 2006/0012987 A9 | 1/2006 | Ducharme et al. |
| 2006/0012997 A1 | 1/2006 | Catalano et al. |
| 2006/0016960 A1 | 1/2006 | Morgan et al. |
| 2006/0022214 A1 | 2/2006 | Morgan et al. |
| 2006/0028155 A1 | 2/2006 | Young |
| 2006/0028837 A1 | 2/2006 | Mrakovich |
| 2006/0034078 A1 | 2/2006 | Kovacik et al. |
| 2006/0044152 A1 | 3/2006 | Wang |
| 2006/0050509 A9 | 3/2006 | Dowling et al. |
| 2006/0050514 A1 | 3/2006 | Opolka |
| 2006/0056855 A1 | 3/2006 | Nakagawa et al. |
| 2006/0066447 A1 | 3/2006 | Davenport et al. |
| 2006/0076908 A1 | 4/2006 | Morgan et al. |
| 2006/0081863 A1 | 4/2006 | Kim et al. |
| 2006/0091826 A1 | 5/2006 | Chen |
| 2006/0092640 A1 | 5/2006 | Li |
| 2006/0098077 A1 | 5/2006 | Dowling |
| 2006/0104058 A1 | 5/2006 | Chemel et al. |
| 2006/0109648 A1 | 5/2006 | Trenchard et al. |
| 2006/0109649 A1 | 5/2006 | Ducharme et al. |
| 2006/0109661 A1 | 5/2006 | Coushaine et al. |
| 2006/0126325 A1 | 6/2006 | Lefebvre et al. |
| 2006/0126338 A1 | 6/2006 | Mighetto |
| 2006/0132061 A1 | 6/2006 | McCormick et al. |
| 2006/0132323 A1 | 6/2006 | Grady, Jr. |
| 2006/0146531 A1 | 7/2006 | Reo et al. |
| 2006/0152172 A9 | 7/2006 | Mueller et al. |
| 2006/0158881 A1 | 7/2006 | Dowling |
| 2006/0170376 A1 | 8/2006 | Piepgras et al. |
| 2006/0192502 A1 | 8/2006 | Brown et al. |
| 2006/0193131 A1 | 8/2006 | McGrath et al. |
| 2006/0196953 A1 | 9/2006 | Simon et al. |
| 2006/0197661 A1* | 9/2006 | Tracy ................ G08B 5/36 340/541 |
| 2006/0198128 A1 | 9/2006 | Piepgras et al. |
| 2006/0208667 A1 | 9/2006 | Lys et al. |
| 2006/0215422 A1 | 9/2006 | Laizure, Jr. et al. |
| 2006/0220595 A1 | 10/2006 | Lu |
| 2006/0221606 A1 | 10/2006 | Dowling |
| 2006/0221619 A1 | 10/2006 | Nishigaki |
| 2006/0227558 A1 | 10/2006 | Osawa et al. |
| 2006/0232974 A1 | 10/2006 | Lee et al. |
| 2006/0238884 A1 | 10/2006 | Jang et al. |
| 2006/0262516 A9 | 11/2006 | Dowling et al. |
| 2006/0262521 A1 | 11/2006 | Piepgras et al. |
| 2006/0262544 A1 | 11/2006 | Piepgras et al. |
| 2006/0262545 A1 | 11/2006 | Piepgras et al. |
| 2006/0265921 A1* | 11/2006 | Korall ................ G09F 13/06 40/579 |
| 2006/0273741 A1 | 12/2006 | Stalker, III |
| 2006/0274529 A1 | 12/2006 | Cao |
| 2006/0285325 A1 | 12/2006 | Ducharme et al. |
| 2007/0035255 A1 | 2/2007 | Shuster et al. |
| 2007/0035538 A1 | 2/2007 | Garcia et al. |
| 2007/0035965 A1 | 2/2007 | Holst |
| 2007/0040516 A1 | 2/2007 | Chen |
| 2007/0041220 A1 | 2/2007 | Lynch |
| 2007/0047227 A1 | 3/2007 | Ducharme |
| 2007/0053182 A1 | 3/2007 | Robertson |
| 2007/0053208 A1 | 3/2007 | Justel et al. |
| 2007/0057805 A1 | 3/2007 | Gomez |
| 2007/0064419 A1 | 3/2007 | Gandhi |
| 2007/0064425 A1 | 3/2007 | Frecska et al. |
| 2007/0070621 A1 | 3/2007 | Rivas et al. |
| 2007/0070631 A1 | 3/2007 | Huang et al. |
| 2007/0081423 A1 | 4/2007 | Chien |
| 2007/0086754 A1 | 4/2007 | Lys et al. |
| 2007/0086912 A1 | 4/2007 | Dowling et al. |
| 2007/0097678 A1 | 5/2007 | Yang |
| 2007/0109763 A1 | 5/2007 | Wolf et al. |
| 2007/0115658 A1 | 5/2007 | Mueller et al. |
| 2007/0115665 A1 | 5/2007 | Mueller et al. |
| 2007/0120463 A1 | 5/2007 | Hayashi et al. |
| 2007/0120594 A1 | 5/2007 | Balakrishnan et al. |
| 2007/0127234 A1 | 6/2007 | Jervey, III |
| 2007/0133202 A1 | 6/2007 | Huang et al. |
| 2007/0139938 A1 | 6/2007 | Petroski et al. |
| 2007/0145915 A1 | 6/2007 | Roberge et al. |
| 2007/0146126 A1 | 6/2007 | Wang |
| 2007/0147046 A1 | 6/2007 | Arik et al. |
| 2007/0152797 A1 | 7/2007 | Chemel et al. |
| 2007/0152808 A1* | 7/2007 | LaCasse ................ G08B 7/062 340/524 |
| 2007/0153514 A1 | 7/2007 | Dowling et al. |
| 2007/0159828 A1 | 7/2007 | Wang |
| 2007/0165402 A1 | 7/2007 | Weaver, Jr. et al. |
| 2007/0165405 A1 | 7/2007 | Chen |
| 2007/0173978 A1 | 7/2007 | Fein et al. |
| 2007/0177382 A1 | 8/2007 | Pritchard et al. |
| 2007/0182387 A1 | 8/2007 | Weirich |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0195527 A1 | 8/2007 | Russell |
| 2007/0195532 A1 | 8/2007 | Reisenauer et al. |
| 2007/0200725 A1 | 8/2007 | Fredericks et al. |
| 2007/0205712 A1 | 9/2007 | Radkov et al. |
| 2007/0206375 A1 | 9/2007 | Piepgras et al. |
| 2007/0211461 A1* | 9/2007 | Harwood ................ G08B 7/066 362/232 |
| 2007/0211463 A1 | 9/2007 | Chevalier et al. |
| 2007/0228999 A1 | 10/2007 | Kit |
| 2007/0235751 A1 | 10/2007 | Radkov et al. |
| 2007/0236156 A1 | 10/2007 | Lys et al. |
| 2007/0236358 A1* | 10/2007 | Street ................ G08B 1/08 340/628 |
| 2007/0237284 A1 | 10/2007 | Lys et al. |
| 2007/0240346 A1 | 10/2007 | Li et al. |
| 2007/0241657 A1 | 10/2007 | Radkov et al. |
| 2007/0242466 A1 | 10/2007 | Wu et al. |
| 2007/0247450 A1 | 10/2007 | Lee |
| 2007/0247842 A1* | 10/2007 | Zampini ................ F21S 2/00 362/227 |
| 2007/0247847 A1 | 10/2007 | Villard |
| 2007/0247851 A1 | 10/2007 | Villard |
| 2007/0252161 A1 | 11/2007 | Meis et al. |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0274070 A1 | 11/2007 | Wedell |
| 2007/0281520 A1 | 12/2007 | Insalaco et al. |
| 2007/0285926 A1 | 12/2007 | Maxik |
| 2007/0285933 A1 | 12/2007 | Southard et al. |
| 2007/0290625 A1 | 12/2007 | He et al. |
| 2007/0291483 A1 | 12/2007 | Lys |
| 2007/0296350 A1 | 12/2007 | Maxik et al. |
| 2008/0003664 A1 | 1/2008 | Tysoe et al. |
| 2008/0007945 A1 | 1/2008 | Kelly et al. |
| 2008/0012502 A1 | 1/2008 | Lys |
| 2008/0012506 A1 | 1/2008 | Mueller et al. |
| 2008/0013316 A1 | 1/2008 | Chiang |
| 2008/0013324 A1 | 1/2008 | Yu |
| 2008/0018261 A1 | 1/2008 | Kastner |
| 2008/0024067 A1 | 1/2008 | Ishibashi |
| 2008/0037226 A1 | 2/2008 | Shin et al. |
| 2008/0037245 A1 | 2/2008 | Chan |
| 2008/0037284 A1 | 2/2008 | Rudisill |
| 2008/0049434 A1 | 2/2008 | Marsh |
| 2008/0055894 A1 | 3/2008 | Deng |
| 2008/0062680 A1 | 3/2008 | Timmermans et al. |
| 2008/0068838 A1 | 3/2008 | Galke et al. |
| 2008/0068839 A1 | 3/2008 | Matheson |
| 2008/0074872 A1 | 3/2008 | Panotopoulos |
| 2008/0089075 A1 | 4/2008 | Hsu |

(56) References Cited

U.S. PATENT DOCUMENTS

| | | |
|---|---|---|
| 2008/0092800 A1* | 4/2008 | Smith ............... H05B 33/0842 116/202 |
| 2008/0093615 A1 | 4/2008 | Lin et al. |
| 2008/0093998 A1 | 4/2008 | Dennery et al. |
| 2008/0094819 A1 | 4/2008 | Vaish |
| 2008/0094837 A1 | 4/2008 | Dobbins et al. |
| 2008/0129211 A1 | 6/2008 | Lin et al. |
| 2008/0130267 A1 | 6/2008 | Dowling et al. |
| 2008/0150444 A1 | 6/2008 | Usui et al. |
| 2008/0151535 A1 | 6/2008 | de Castris |
| 2008/0158871 A1 | 7/2008 | McAvoy et al. |
| 2008/0158887 A1 | 7/2008 | Zhu et al. |
| 2008/0164826 A1 | 7/2008 | Lys |
| 2008/0164827 A1 | 7/2008 | Lys |
| 2008/0164854 A1 | 7/2008 | Lys |
| 2008/0175003 A1 | 7/2008 | Tsou et al. |
| 2008/0180036 A1 | 7/2008 | Garrity et al. |
| 2008/0185961 A1 | 8/2008 | Hong |
| 2008/0186704 A1 | 8/2008 | Chou et al. |
| 2008/0192436 A1 | 8/2008 | Peng et al. |
| 2008/0198598 A1 | 8/2008 | Ward |
| 2008/0211386 A1 | 9/2008 | Choi et al. |
| 2008/0211419 A1 | 9/2008 | Garrity |
| 2008/0218993 A1 | 9/2008 | Li |
| 2008/0224629 A1 | 9/2008 | Melanson |
| 2008/0224636 A1 | 9/2008 | Melanson |
| 2008/0253125 A1 | 10/2008 | Kang et al. |
| 2008/0258631 A1 | 10/2008 | Wu et al. |
| 2008/0258647 A1 | 10/2008 | Scianna |
| 2008/0265799 A1 | 10/2008 | Sibert |
| 2008/0278092 A1 | 11/2008 | Lys et al. |
| 2008/0285257 A1 | 11/2008 | King |
| 2008/0285266 A1 | 11/2008 | Thomas |
| 2008/0290814 A1 | 11/2008 | Leong et al. |
| 2008/0291675 A1 | 11/2008 | Lin et al. |
| 2008/0298080 A1 | 12/2008 | Wu et al. |
| 2008/0304249 A1 | 12/2008 | Davey et al. |
| 2008/0310119 A1 | 12/2008 | Giacoma |
| 2008/0315773 A1 | 12/2008 | Pang |
| 2008/0315784 A1 | 12/2008 | Tseng |
| 2009/0002995 A1 | 1/2009 | Lee et al. |
| 2009/0016063 A1 | 1/2009 | Hu |
| 2009/0016068 A1 | 1/2009 | Chang |
| 2009/0018954 A1 | 1/2009 | Roberts |
| 2009/0021140 A1 | 1/2009 | Takasu et al. |
| 2009/0032604 A1 | 2/2009 | Miller |
| 2009/0033513 A1 | 2/2009 | Salsbury et al. |
| 2009/0046473 A1 | 2/2009 | Tsai et al. |
| 2009/0052186 A1 | 2/2009 | Xue |
| 2009/0059557 A1 | 3/2009 | Tanaka |
| 2009/0059559 A1 | 3/2009 | Pabst et al. |
| 2009/0059603 A1 | 3/2009 | Recker et al. |
| 2009/0065596 A1 | 3/2009 | Seem et al. |
| 2009/0067170 A1 | 3/2009 | Bloemen et al. |
| 2009/0067182 A1 | 3/2009 | Hsu et al. |
| 2009/0072945 A1 | 3/2009 | Pan et al. |
| 2009/0073693 A1 | 3/2009 | Nall et al. |
| 2009/0085500 A1 | 4/2009 | Zampini, II et al. |
| 2009/0086492 A1 | 4/2009 | Meyer |
| 2009/0091929 A1 | 4/2009 | Faubion |
| 2009/0091938 A1 | 4/2009 | Jacobson et al. |
| 2009/0096630 A1* | 4/2009 | Belanger ............... G09F 9/33 340/815.45 |
| 2009/0101930 A1 | 4/2009 | Li |
| 2009/0115597 A1 | 5/2009 | Giacalone |
| 2009/0139690 A1 | 6/2009 | Maerz et al. |
| 2009/0140285 A1 | 6/2009 | Lin et al. |
| 2009/0175041 A1 | 7/2009 | Yuen et al. |
| 2009/0185373 A1 | 7/2009 | Grajcar |
| 2009/0195186 A1 | 8/2009 | Guest et al. |
| 2009/0196034 A1 | 8/2009 | Gherardini et al. |
| 2009/0212924 A1* | 8/2009 | Picard ............... G08B 7/062 340/286.05 |
| 2009/0213588 A1 | 8/2009 | Manes |
| 2009/0219713 A1 | 9/2009 | Siemiet et al. |
| 2009/0231831 A1 | 9/2009 | Hsiao et al. |
| 2009/0268461 A1 | 10/2009 | Deak et al. |
| 2009/0273924 A1 | 11/2009 | Chiang |
| 2009/0273926 A1 | 11/2009 | Deng |
| 2009/0284169 A1 | 11/2009 | Valois |
| 2009/0290334 A1 | 11/2009 | Ivey et al. |
| 2009/0295776 A1 | 12/2009 | Yu et al. |
| 2009/0296017 A1 | 12/2009 | Itoh et al. |
| 2009/0302730 A1 | 12/2009 | Carroll et al. |
| 2009/0303720 A1 | 12/2009 | McGrath |
| 2009/0316408 A1 | 12/2009 | Villard |
| 2010/0002453 A1 | 1/2010 | Wu et al. |
| 2010/0008085 A1 | 1/2010 | Ivey et al. |
| 2010/0019689 A1 | 1/2010 | Shan |
| 2010/0027259 A1 | 2/2010 | Simon et al. |
| 2010/0033095 A1 | 2/2010 | Sadwick |
| 2010/0033964 A1 | 2/2010 | Choi et al. |
| 2010/0046222 A1 | 2/2010 | Yang |
| 2010/0061598 A1 | 3/2010 | Seo |
| 2010/0071946 A1 | 3/2010 | Hashimoto |
| 2010/0072904 A1 | 3/2010 | Eckel et al. |
| 2010/0073944 A1 | 3/2010 | Chen |
| 2010/0079085 A1 | 4/2010 | Wendt et al. |
| 2010/0096992 A1 | 4/2010 | Yamamoto et al. |
| 2010/0096998 A1 | 4/2010 | Beers |
| 2010/0103664 A1 | 4/2010 | Simon et al. |
| 2010/0103673 A1 | 4/2010 | Ivey et al. |
| 2010/0106306 A1 | 4/2010 | Simon et al. |
| 2010/0109550 A1 | 5/2010 | Huda et al. |
| 2010/0109558 A1 | 5/2010 | Chew |
| 2010/0141173 A1 | 6/2010 | Negrete |
| 2010/0148650 A1 | 6/2010 | Wu et al. |
| 2010/0149806 A1 | 6/2010 | Yiu |
| 2010/0157608 A1 | 6/2010 | Chen et al. |
| 2010/0164404 A1 | 7/2010 | Shao et al. |
| 2010/0177532 A1 | 7/2010 | Simon et al. |
| 2010/0181178 A1 | 7/2010 | Chang et al. |
| 2010/0207547 A1 | 8/2010 | Kuroki et al. |
| 2010/0220469 A1 | 9/2010 | Ivey et al. |
| 2010/0265732 A1 | 10/2010 | Liu |
| 2010/0270925 A1 | 10/2010 | Withers |
| 2010/0277069 A1 | 11/2010 | Janik et al. |
| 2010/0289418 A1 | 11/2010 | Langovsky |
| 2010/0308733 A1 | 12/2010 | Shao |
| 2010/0320922 A1 | 12/2010 | Palazzolo et al. |
| 2011/0006658 A1 | 1/2011 | Chan et al. |
| 2011/0090682 A1 | 4/2011 | Zheng et al. |
| 2011/0109454 A1* | 5/2011 | McSheffrey, Sr. ........ A61N 1/39 340/568.1 |
| 2011/0140136 A1 | 6/2011 | Daily et al. |
| 2011/0141745 A1 | 6/2011 | Gu et al. |
| 2011/0149564 A1 | 6/2011 | Hsia et al. |
| 2011/0156584 A1 | 6/2011 | Kim |
| 2011/0176298 A1 | 7/2011 | Meurer et al. |
| 2011/0199723 A1 | 8/2011 | Sato |
| 2011/0199769 A1 | 8/2011 | Bretschneider et al. |
| 2011/0204777 A1 | 8/2011 | Lenk |
| 2011/0280010 A1 | 11/2011 | Ou et al. |
| 2011/0291588 A1 | 12/2011 | Tagare |
| 2012/0008315 A1 | 1/2012 | Simon et al. |
| 2012/0014086 A1 | 1/2012 | Jonsson |
| 2012/0043892 A1 | 2/2012 | Visser et al. |
| 2012/0063140 A1 | 3/2012 | Kong |
| 2012/0098439 A1* | 4/2012 | Recker ............... H05B 33/0815 315/152 |
| 2012/0106144 A1 | 5/2012 | Chang |
| 2012/0106153 A1 | 5/2012 | Huang et al. |
| 2012/0113628 A1 | 5/2012 | Burrow et al. |
| 2012/0120660 A1 | 5/2012 | Grauvogel |
| 2012/0127726 A1 | 5/2012 | Yen |
| 2012/0139417 A1 | 6/2012 | Mironichev et al. |
| 2012/0146503 A1 | 6/2012 | Negley et al. |
| 2012/0147597 A1 | 6/2012 | Farmer |
| 2012/0153865 A1 | 6/2012 | Rolfes et al. |
| 2012/0155073 A1 | 6/2012 | McCanless et al. |
| 2012/0161666 A1 | 6/2012 | Antony et al. |
| 2012/0194086 A1 | 8/2012 | Liu et al. |
| 2012/0195032 A1 | 8/2012 | Shew |
| 2012/0212951 A1 | 8/2012 | Lai et al. |

(56) References Cited

U.S. PATENT DOCUMENTS

| | | |
|---|---|---|
| 2012/0212953 A1 | 8/2012 | Bloom et al. |
| 2012/0230044 A1 | 9/2012 | Zhang et al. |
| 2012/0236533 A1 | 9/2012 | Nakamura et al. |
| 2012/0236554 A1 | 9/2012 | Rust |
| 2012/0243216 A1 | 9/2012 | Lai et al. |
| 2012/0243217 A1 | 9/2012 | Szprengiel et al. |
| 2012/0274214 A1 | 11/2012 | Radermacher et al. |
| 2012/0275154 A1 | 11/2012 | Hood et al. |
| 2012/0293991 A1 | 11/2012 | Lin |
| 2012/0293996 A1 | 11/2012 | Thomas et al. |
| 2012/0300409 A1 | 11/2012 | Lee |
| 2012/0300445 A1 | 11/2012 | Chu et al. |
| 2012/0300468 A1 | 11/2012 | Chang et al. |
| 2012/0300486 A1 | 11/2012 | Matsushita et al. |
| 2012/0307524 A1 | 12/2012 | Schapira et al. |
| 2012/0320598 A1 | 12/2012 | Son |
| 2013/0010473 A1 | 1/2013 | Dellian et al. |
| 2013/0039051 A1 | 2/2013 | Wu |
| 2013/0044471 A1 | 2/2013 | Chen |
| 2013/0044476 A1 | 2/2013 | Bretschneider et al. |
| 2013/0050997 A1 | 2/2013 | Bretschneider et al. |
| 2013/0050998 A1 | 2/2013 | Chu et al. |
| 2013/0057146 A1 | 3/2013 | Chao |
| 2013/0058079 A1 | 3/2013 | Dellian et al. |
| 2013/0063944 A1 | 3/2013 | Lodhie et al. |
| 2013/0077297 A1 | 3/2013 | Wu et al. |
| 2013/0094200 A1 | 4/2013 | Dellian et al. |
| 2013/0148349 A1 | 6/2013 | Pasqualini et al. |
| 2013/0206597 A1 | 8/2013 | Wang et al. |
| 2013/0242553 A1 | 9/2013 | Feng et al. |
| 2013/0250610 A1 | 9/2013 | Brick et al. |
| 2014/0009926 A1 | 1/2014 | Simon et al. |

FOREIGN PATENT DOCUMENTS

| | | |
|---|---|---|
| CN | 2869556 Y | 2/2007 |
| CN | 101016976 | 8/2007 |
| CN | 101016976 A | 8/2007 |
| CN | 101075605 | 11/2007 |
| CN | 201129681 Y | 10/2008 |
| CN | 201184574 Y | 1/2009 |
| CN | 101737664 A | 6/2010 |
| DE | 19651140 A1 | 6/1997 |
| DE | 19624087 A1 | 12/1997 |
| DE | 29819966 U1 | 3/1999 |
| DE | 29817609 U1 | 1/2000 |
| DE | 20018865 U1 | 2/2001 |
| EP | 0013782 B1 | 3/1983 |
| EP | 0091172 A2 | 10/1983 |
| EP | 0124924 B1 | 9/1987 |
| EP | 0174699 B1 | 11/1988 |
| EP | 0197602 B1 | 11/1990 |
| EP | 0714556 | 1/1991 |
| EP | 0214701 B1 | 3/1992 |
| EP | 0262713 B1 | 6/1992 |
| EP | 0203668 B1 | 2/1993 |
| EP | 0272749 B1 | 8/1993 |
| EP | 0337567 B1 | 11/1993 |
| EP | 0390262 B1 | 12/1993 |
| EP | 0359329 B1 | 3/1994 |
| EP | 0403011 B1 | 4/1994 |
| EP | 0632511 | 1/1995 |
| EP | 0432848 B1 | 4/1995 |
| EP | 0659531 A1 | 6/1995 |
| EP | 0403001 B1 | 8/1995 |
| EP | 0525876 | 5/1996 |
| EP | 0889283 A1 | 7/1999 |
| EP | 0458408 B1 | 9/1999 |
| EP | 0578302 B1 | 9/1999 |
| EP | 0723701 B1 | 1/2000 |
| EP | 1142452 B1 | 3/2001 |
| EP | 0787419 B1 | 5/2001 |
| EP | 1195740 | 4/2002 |
| EP | 1016062 B1 | 8/2002 |
| EP | 1149510 | 2/2003 |
| EP | 1056993 B1 | 3/2003 |
| EP | 0766436 B1 | 5/2003 |
| EP | 0924281 B1 | 5/2003 |
| EP | 0826167 B1 | 6/2003 |
| EP | 1147686 | 1/2004 |
| EP | 1145602 B1 | 3/2004 |
| EP | 1422975 | 5/2004 |
| EP | 0890059 B1 | 6/2004 |
| EP | 1348319 | 6/2005 |
| EP | 1037862 B1 | 7/2005 |
| EP | 1346609 | 8/2005 |
| EP | 1321012 | 12/2005 |
| EP | 1610593 | 12/2005 |
| EP | 1624728 | 4/2006 |
| EP | 1415517 | 5/2006 |
| EP | 1415518 | 5/2006 |
| EP | 1438877 | 5/2006 |
| EP | 1166604 | 6/2006 |
| EP | 1479270 | 7/2006 |
| EP | 1348318 | 8/2006 |
| EP | 1399694 | 8/2006 |
| EP | 1461980 | 10/2006 |
| EP | 1110120 B1 | 4/2007 |
| EP | 1440604 | 4/2007 |
| EP | 1047903 | 6/2007 |
| EP | 1500307 | 6/2007 |
| EP | 0922305 B1 | 8/2007 |
| EP | 0922306 B1 | 8/2007 |
| EP | 1194918 | 8/2007 |
| EP | 1833035 | 9/2007 |
| EP | 1048085 B1 | 11/2007 |
| EP | 1852648 | 11/2007 |
| EP | 1763650 | 12/2007 |
| EP | 1776722 | 1/2008 |
| EP | 1873012 | 1/2008 |
| EP | 1459599 | 2/2008 |
| EP | 1887836 | 2/2008 |
| EP | 1579733 | 4/2008 |
| EP | 1145282 B1 | 7/2008 |
| EP | 1157428 | 9/2008 |
| EP | 1000522 B1 | 12/2008 |
| EP | 1502483 | 12/2008 |
| EP | 1576858 | 12/2008 |
| EP | 1646092 | 1/2009 |
| EP | 1579736 | 2/2009 |
| EP | 1889519 | 3/2009 |
| EP | 1537354 | 4/2009 |
| EP | 1218445 | 5/2009 |
| EP | 1518445 | 5/2009 |
| EP | 1337784 | 6/2009 |
| EP | 2013530 | 8/2009 |
| EP | 2430888 | 3/2012 |
| EP | 2469155 | 6/2012 |
| EP | 2573457 | 3/2013 |
| EP | 2554895 | 6/2013 |
| FR | 2813115 | 2/2002 |
| GB | 2165977 A | 4/1986 |
| GB | 2215024 | 9/1989 |
| GB | 2324901 | 11/1998 |
| GB | 2447257 | 9/2008 |
| GB | 2472345 | 2/2011 |
| GB | 2486410 | 6/2012 |
| JP | S62241382 | 10/1987 |
| JP | H06-054289 | 2/1994 |
| JP | H6-54103 | 7/1994 |
| JP | 07-249467 | 9/1995 |
| JP | H07-264036 | 10/1995 |
| JP | 08-162677 | 6/1996 |
| JP | H10308536 | 11/1998 |
| JP | 11-135274 | 5/1999 |
| JP | H11-162234 | 6/1999 |
| JP | H11-260125 | 9/1999 |
| JP | 2001/238272 | 8/2001 |
| JP | 2001-291406 | 10/2001 |
| JP | 2002/141555 | 5/2002 |
| JP | 2002289373 A | 10/2002 |
| JP | 2004-047346 | 2/2004 |
| JP | 3098271 | 2/2004 |
| JP | 2004-119078 | 4/2004 |

(56) References Cited

FOREIGN PATENT DOCUMENTS

| | | |
|---|---|---|
| JP | 2004-273234 | 9/2004 |
| JP | 2004-335426 | 11/2004 |
| JP | 2005-158363 | 6/2005 |
| JP | 2005-166617 | 6/2005 |
| JP | 2005/347214 | 12/2005 |
| JP | 2006012859 A | 1/2006 |
| JP | 2006/507641 | 3/2006 |
| JP | 2005-322866 | 12/2006 |
| JP | 2007-227342 | 9/2007 |
| JP | 3139714 | 2/2008 |
| JP | 2008-186758 | 8/2008 |
| JP | 2008/258124 | 10/2008 |
| JP | 2008-293753 | 12/2008 |
| JP | 3154200 | 10/2009 |
| JP | 2009283183 A | 12/2009 |
| JP | 4491695 B1 | 6/2010 |
| JP | 2010-192229 | 9/2010 |
| JP | 2010-205553 | 9/2010 |
| KR | 10-2004-0008244 | 1/2004 |
| KR | 10-2004-0008244 A | 1/2004 |
| KR | 10-2006-0112113 | 10/2006 |
| KR | 10-2006-0112113 A | 10/2006 |
| KR | 20-0430022 | 11/2006 |
| KR | 20-0430022 Y1 | 11/2006 |
| KR | 10-2006-0133784 A | 12/2006 |
| KR | 10-2007-0063595 | 6/2007 |
| KR | 10-2007-0063595 A | 6/2007 |
| KR | 10-2006-0133784 | 12/2007 |
| KR | 10-0781652 | 12/2007 |
| KR | 10-0844538 | 7/2008 |
| KR | 10-0888669 | 3/2009 |
| KR | 10-0927851 | 11/2009 |
| TW | M337036 | 7/2008 |
| TW | M349465 | 1/2009 |
| TW | M349465 U | 1/2009 |
| WO | 99-06759 A1 | 2/1999 |
| WO | WO 1999/06759 | 2/1999 |
| WO | 99-10867 A1 | 3/1999 |
| WO | WO 1999/10867 | 3/1999 |
| WO | 99-31560 A2 | 6/1999 |
| WO | WO 1999/31560 | 6/1999 |
| WO | WO 1999/45312 | 9/1999 |
| WO | WO 1999/57945 | 11/1999 |
| WO | WO 2000/01067 | 1/2000 |
| WO | WO 2001/23469 | 4/2001 |
| WO | WO 2002/025842 | 3/2002 |
| WO | WO 2002/061330 | 8/2002 |
| WO | WO 2002/069306 | 9/2002 |
| WO | WO 2002/091805 | 11/2002 |
| WO | WO 2002/098182 | 12/2002 |
| WO | WO 2002/099780 | 12/2002 |
| WO | WO 2003/026358 | 3/2003 |
| WO | WO 2003/055273 | 7/2003 |
| WO | WO 2003/067934 | 8/2003 |
| WO | WO 2003/090890 | 11/2003 |
| WO | WO 2003/096761 | 11/2003 |
| WO | WO 2004/021747 | 3/2004 |
| WO | WO 2004/023033 | 3/2004 |
| WO | WO 2004/023850 | 3/2004 |
| WO | WO 2004/032572 | 4/2004 |
| WO | WO 2004/057924 | 4/2004 |
| WO | WO 2004/057921 | 7/2004 |
| WO | WO 2004/060023 | 7/2004 |
| WO | WO 2004/100624 | 11/2004 |
| WO | WO 2006/100624 | 11/2004 |
| WO | WO 2005/031860 | 4/2005 |
| WO | WO 2005/052751 | 6/2005 |
| WO | WO 2005/060309 | 6/2005 |
| WO | WO 2005/084339 | 9/2005 |
| WO | WO 2005/089293 | 9/2005 |
| WO | WO 2005/089309 | 9/2005 |
| WO | WO 2005/103555 | 11/2005 |
| WO | WO 2005/116519 | 12/2005 |
| WO | WO 2006/023149 | 3/2006 |
| WO | WO 2006/044328 | 4/2006 |
| WO | WO 2006/046207 | 5/2006 |
| WO | WO 2006/056120 | 6/2006 |
| WO | WO 2006/093889 | 9/2006 |
| WO | WO 2006/126172 | 11/2006 |
| WO | WO 2006/127666 | 11/2006 |
| WO | WO 2006/127785 | 11/2006 |
| WO | WO 2006/133272 | 12/2006 |
| WO | WO 2006/137686 | 12/2006 |
| WO | WO 2007/004679 | 1/2007 |
| WO | WO 2007/081674 | 7/2007 |
| WO | WO 2007/090292 | 8/2007 |
| WO | WO 2007/094810 | 8/2007 |
| WO | WO 2008/018002 | 2/2008 |
| WO | WO 2008/027093 | 3/2008 |
| WO | WO 2008/061991 | 5/2008 |
| WO | WO 2008/110978 | 9/2008 |
| WO | WO 2008/137460 | 11/2008 |
| WO | WO 2009/061124 | 5/2009 |
| WO | WO 2009/067074 | 5/2009 |
| WO | WO 2009/111978 | 9/2009 |
| WO | WO 2009/143047 | 11/2009 |
| WO | WO 2010/014437 | 2/2010 |
| WO | WO 2010/030509 | 3/2010 |
| WO | WO 2010/047896 | 4/2010 |
| WO | WO 2010/047898 | 4/2010 |
| WO | WO 2010/047973 | 4/2010 |
| WO | WO 2010/069983 | 6/2010 |
| WO | WO 2010/083370 | 7/2010 |
| WO | WO 2010/088105 | 8/2010 |
| WO | WO 2010/132625 | 11/2010 |
| WO | WO 2010/141537 | 12/2010 |
| WO | WO 2011/005562 | 1/2011 |
| WO | WO 2011/005579 | 1/2011 |
| WO | WO 2011/072308 | 6/2011 |
| WO | WO 2011/113709 | 9/2011 |
| WO | WO 2011/117059 | 9/2011 |
| WO | WO 2012/001584 | 1/2012 |
| WO | WO 2012/004708 | 1/2012 |
| WO | WO 2012/007899 | 1/2012 |
| WO | WO 2012/025626 | 3/2012 |
| WO | WO 2012/063174 | 5/2012 |
| WO | WO 2012/117018 | 9/2012 |
| WO | WO 2012/129301 | 9/2012 |
| WO | WO 2012/131522 | 10/2012 |
| WO | WO 2012/131547 | 10/2012 |
| WO | WO 2013/028965 | 2/2013 |
| WO | WO 2013/029960 | 3/2013 |
| WO | WO 2013/030128 | 3/2013 |
| WO | WO 2013/045255 | 4/2013 |
| WO | WO 2013/045439 | 4/2013 |
| WO | WO 2013/057660 | 4/2013 |
| WO | WO 2013/079242 | 6/2013 |
| WO | WO 2013/088299 | 6/2013 |
| WO | WO 2013/097823 | 7/2013 |
| WO | WO 2013/098700 | 7/2013 |
| WO | WO2013132383 A1 | 9/2013 |
| WO | WO2013135527 A1 | 9/2013 |

OTHER PUBLICATIONS

Extended European Search Report for European Application No. 09822382.9 dated Sep. 19, 2014 in 8 pages.
ISR & WO for PCT/US2015011711 dated Mar. 23, 2015.
Office Action in related Japanese matter, dated Feb. 24, 2015 (4039B-JP).
Extended European Search Report issued in European Application No. 17202911.8 dated Feb. 19, 2018, 6 pages.
Airport International. Fly High With Intelligent Airport Building and Security Solutions [online], [retrieved on Oct. 24, 2008]. Retrieved from Airport International web page using Internet <URL: http://www.airport-int.com/categories/airport-building-and-security-solut-ions/fly-high-with-intelligent-airport-building-and-security-solutions.html>.
Best Practice Guide—Commercial Office Buildings—Central HVAC System. [online], [Retrieved on Jan. 17, 2008] Retrieved from Flex Your Power Organization web page using Internet <URL: http://www.fypower.org/bpg/module.html?b=offices&m+Central HVAC Systems&s=Contr . . . >.

(56) References Cited

OTHER PUBLICATIONS

Cornell University. Light Canopy—Cornell University Solar Decathlon, [online], [retrieved on Jan. 17, 2008] Retrieved from Cornell University web page using Internet <URL: http://cusd.cornell.edu/cusd/web/index.php/page/show/section/Design/page/-controls>.
D.N.A.-III, [online], [retrieved Mar. 10, 2009] Retrieved from the PLC Lighting Web Page using Internet <URL: http://www.plclighting.com/product_info.php?cPath=1&products_id=92>.
E20112-22 Starburst Collection, [online], [retrieved on Jul. 10, 2010] Retrieved ET2 Contemporary Lighting using Internet <URL:http://www.et2online.com/proddetail.aspx?ItemID=E20112-22>.
E20116-18 Larmes Collection, [online], [retrieved on Jul. 10, 2010] Retrieved ET2 Contemporary Lighting using Internet <URL:http://www.et2online.com/proddetail.aspx?ItemID=E20116-18>.
E20524-10 & E20525-10 Curva Collection, [online], [retrieved on Jul. 10, 2010] Retrieved ET2 Contemporary Lighting using Internet <URL:http://www.et2online.com/proddetail.aspx?ItemID=E20524-10 & E20525-10>.
E20743-09 Stealth Collection, [online], [retrieved on Jul. 10, 2010] Retrieved from ET2 Contemporary Lighting using Internet <URL:http://www.et2online.com/proddetail.aspx?ItemID=E20743-09>.
E22201-44 Espirit Collection, [online], [retrieved on Jul. 10, 2010] Retreieved from ET2 Contemporary Lighting using Internet <URL:http://www.et2online.com/proddetail.aspx?ItemID=E22201-44>.
Experiment Electronic Ballast. Electronic Ballast for Fluorescent Lamps [online], Revised Fall of 2007. Retrieved on Sep. 1, 1997]. Retrieved from Virginia Tech Web Page using Internet <URL: http://www.ece.vt.edu/ece3354/labs/ballast.pdf. >.
Henson, Keith. The Benefits of Building Systems Integration, Access Control & Security Systems Integration, Oct. 1, 2000, Penton Media. [online], [retrieved on Oct. 24, 2008] Retrieved from Security Solutions Web page using Internet <URL: http://securitysolutions.com/mag/security.sub.--benefits.sub.--building.sub.--systems/>.
International Search Report and Written Opinion in International Application No. PCT/US2009/057072, dated Apr. 30, 2010, filed Sep. 16, 2009.
Lawrence Berkeley National Laboratory. Lighting Control System—Phase Cut Carrier. University of California, [online] [retrieved on Jan. 14, 2008] Retrieved from Lawrence Berkeley National Laboratory web page using Internet <URL: http://www.lbl.gov/tt/techs/lbn11871.html>.
LED Lights, Replacement LED lamps for any incandescent light, [online], [retrieved on Jan. 13, 2000] Retrieved from LED Lights Web Page using Internet <URL: http://www.ledlights.com/replac.htm>.
Ledtronics, Ledtronics Catalog, 1996, p. 10, Ledtronics, Torrance, California.
Phason Electronic Control Systems, Light Level Controller (LLC) case study. Nov. 30, 2004. 3 pages, Phason Inc., Winnipeg, Manitoba, Canada.
Piper. The Best Path to Efficiency. Building Operating Management, Trade Press Publishing Company May 2000 [online], [retrieved on Jan. 17, 2008]. Retrieved from Find Articles Web Page using Internet <URL:http://findarticles.com/p/articles/mi.sub.--qu3922/is.sub.--20000-5/ai.sub.--n8899499/>.
Sensor Switch, nLight Lighting Control System, [online], [retrieved on Jan. 11, 2008] Retrieved from Sensor Switch web page using Internet <URL: http://www.sensorswitch.com>.
Security Solutions, The Benefits of Building Systems Integration, Website.
Six Strategies, [online], [retrieved on Jan. 11, 2008] Retrieved from Encelium Technologies Inc. Web Page using Internet <URL: http://www.encelium.com/products/strategies.html>.
Spencer, Eugene. High Sales, Low Utilization. Green Intelligent Buildings, Feb. 1, 2007. [online]. Retrieved from Green Intelligent Buildings web page using Internet <URL: http://www.greenintelligentbuildings.com/CDA/IBT.sub.--Archive/BNP.sub.---GUID.sub.--9-5-2006.sub.--A.sub.--10000000000000056772>.
Supplementary European Search Report for corresponding European Application No. 09822381.1 dated Jan. 4, 2013 in 5 pages.
Telecite Products & Services—Display Options, [online], [retrieved on Jan. 13, 2000] Retrieved from Telecite Web page using Internet <URL: http://www.telecite.com/en/products/optionsen.htm>.
Traffic Signal Products—Transportation Products Group, [online], [retrieved on Jan. 13, 2000] Retrieved from the Dialight Web Page using Internet <URL: http://www.dialight.com/trans.htm>.
Truck-Lite, LEDSelect—LED, Model 35, Clearance & Marker Lighting, [online], [retrieved on Jan. 13, 2000] Retrieved from Truck-Lite Web Page using Internet <URL: http://trucklite.com/leds14.html>.
Truck-Lite, LEDSelect—LED, Model 45, Stop, Turn & Tail Lighting [online], [retrieved on Jan. 13, 2000] Retrieved from Truck-Lite Web Page using Internet <URL: http://trucklite.com/leds4.html>.
Truck-Lite, LED Select—LED, Super 44, Stop, Turn & Tail Lighting, [online], [retrieved on Jan. 13, 2000] Retrieved from Truck-Lite Web Page using Internet <URL: http://trucklite.com/leds2.html>.
Wolsey, Robert. Interoperable Systems: The Future of Lighting Control, Lighting Research Center, Jan. 1, 1997, vol. 2 No. 2, Rensselaer Polytechnic Institute, Troy, New York [online]. Retrieved Lighting Research Center Web Page using Internet <URL: http://www.lrc.rpi.edu/programs/Futures/LF-BAS/index.asp>.
Extended European Search Report in European Application No. 09822381.1, dated Jan. 4, 2013, 6 pages.
Hightower et al., "A Survey and Taxonomy of Location Systems for Ubiquitous Computing," University of Washington, Computer Science and Engineering, Technical Report UW-CSE Jan. 8, 2003, IEEE, Aug. 24, 2001, 29 pages.
3M.com [online], "LCD Optics 101," available on or before Jan. 6, 2010, via Internet Archive: Wayback Machine <https://web.archive.org/web/20100106113915/http://solutions.3m.com/wps/portal/3M/en_Us/Vikuitil/BrandProducts/secondary/optics101/>, retrieved on May 18, 2018, 1 page.
Philips, "Sense and Simplicity—Licensing Program for LED Luminaires and Retrofits," Philips Intellectual Property & Standards, May 5, 2009.
Arcadianhome.com [online], "PLC Lighting Fireball Modern / Contemporary Pendant Light—PLC-81756-AL," Arcadian Home, available on or before Feb. 27, 2009, retrieved on May 18, 2018, retrieved from < http://www.arcadianlighting.com/plc-81756-al.html>, 2 pages.
PLC-96973-PC PLC Lighting Elgegance Modern/Contemporary Pendant Light, [online], [retrieved on Feb. 27, 2009] Retrieved from the Arcadian Lighting Web Page using Internet <URL:http/www.arcadianlighting.com/plc-96978-pc.html>.
Saha et al., "Location Determination of a Mobile Device using IEEE 802.11b Access Point Signals," IEEE: Wireless Communications and Networking, Mar. 2003, 3:1987-1992.

\* cited by examiner

INTEGRATION OF LED LIGHTING CONTROL WITH EMERGENCY NOTIFICATION SYSTEMS

CROSS-REFERENCE TO RELATED APPLICATIONS

This application is a continuation of U.S. application Ser. No. 13/848,387, filed Mar. 21, 2013, now U.S. Pat. No. 8,830,080, issued Sep. 9, 2014, which is a continuation of U.S. application Ser. No. 12/257,773, filed Oct. 24, 2008, now U.S. Pat. No. 8,653,984, issued Feb. 18, 2014, all of which are hereby incorporated by reference in their entirety.

TECHNICAL FIELD

The present invention relates to emergency notification systems, and more particularly to integrating an emergency notification system with an LED-based light.

BACKGROUND

Many buildings include several types of alarm systems, such as smoke detectors, fire alarms, burglar alarms, and alarms to indicate that a door is ajar. A building may additionally include other alarms depending on the types of danger that the building is susceptible to, e.g., a tornado alarm or an air raid siren. These alarms are generally stand-alone units (i.e., separate from and not in communication with other systems). The alarms may be powered by their own power supplies, such as replaceable batteries. A light may be included with an alarm. For example, some fire alarms include strobe lights that flash to indicate detected fires.

Additionally, buildings have lighting systems. For example, many commercial buildings include fluorescent lighting fixtures for use with fluorescent tubes, though other types of lighting systems using other types of lights, e.g., incandescent lights, are also occasionally used. Fixtures are typically hard-wired to a power source, such as an electric utility line. Additionally, a back-up power source such as a generator may be employed for use when the electric utility line is not functioning. Operation of the lighting system is generally independent of operation of the alarms. That is, the lighting system may produce a generally constant flux of light so long as a switch controlling the lighting system is in an "on" position regardless of whether one or more of the alarms becomes activated.

BRIEF SUMMARY

The present invention provides an emergency lighting system for a building. The lighting system includes at least one LED-based light. An emergency detector is operable to detect an emergency and to produce an emergency signal in response to the emergency. A controller is operable to control the at least one LED-based light in response to the emergency signal.

In another example, an LED-based light for use in an emergency lighting system including an emergency detector operable to output an emergency signal is provided. The LED-based light includes at least one LED and a controller configured to operate the at least one LED in a normal mode and an emergency mode in response to the emergency signal.

In yet another example, an LED-based light for replacing a fluorescent tube in a fixture is provided. The light features a housing including a light transmitting portion. A circuit board extends longitudinally within the housing. Multiple LEDs are mounted on the circuit board and oriented to produce light through the light transmitting portion of the housing. An emergency detector is operable to output an emergency signal in response to an emergency. A controller is operable to control the at least one LED in a normal mode and an emergency mode in response to the emergency signal. A pair of standard sized electrical connectors is included, with one at each longitudinal end of the housing. The LEDs, emergency detector, and controller are each electrically coupled to at least one of the electrical connectors.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
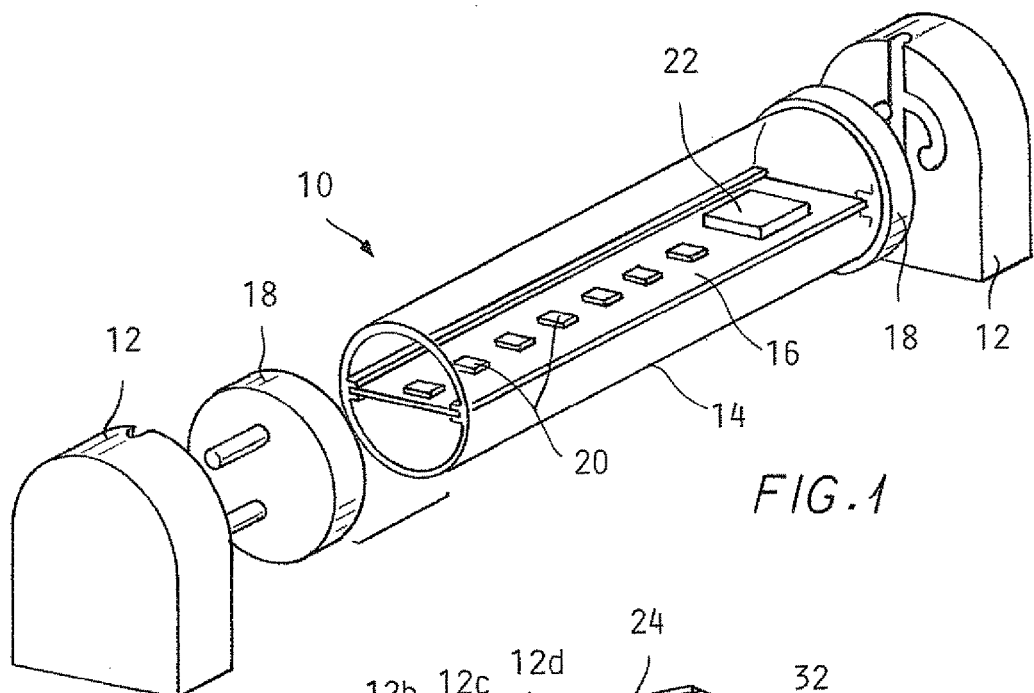
FIG. 1 is a schematic perspective view of an example of an LED-based light for use in an emergency lighting system.

Embodiments of an emergency lighting system and an LED-based light for use in an emergency lighting system according the invention are discussed with reference to FIGS. 1-6. FIG. 1 illustrates an LED-based light 10 for use in a standard fixture 12, such as a fixture designed to accept T5, T8, T10, or T12 tubes. As such, the LED-based light 10 can have the shape of a standard tube, i.e., the shape of a T5, T8, T10, or T12 tube, or otherwise be shaped for compatibility with the standard fixture 12. Alternatively, another example of an LED-based light can have an alternative shape from the illustrated light 10 for use in fixtures that accept other types of standard sized lights, such as incandescent bulbs or standard sized halogen lamps. However, all examples of LED-based lights need not be compatible with the fixture 12 or another type of standard fixture. That is, yet another example of an LED-based light can be powered by a battery or connected to a power source by means such as hard-wiring the light to a power source.

As shown in FIG. 1, the light 10 includes a housing 14, a circuit board 16, a pair of end caps 18, multiple LEDs 20, and a controller 22 in a single package defined by the housing 14 and end caps 18. The housing 14 as shown in FIG. 1 is a light transmitting cylindrical tube. The housing 14 can be made from polycarbonate, acrylic, glass or another light transmitting material (i.e., the housing 14 can be transparent or translucent). For example, a translucent housing 14 can be made from a composite, such as polycarbonate with particles of a light refracting material interspersed in the polycarbonate. While the illustrated housing 14 is cylindrical, a housing having a square, triangular, polygonal, or other cross sectional shape can alternatively be used. Similarly, while the illustrated housing 14 is linear, a housing having an alternative shape, e.g., a U-shape or a circular shape can alternatively be used. Additionally, the housing 14 need not be a single piece as shown in FIG. 1. Instead, another example of a housing can be formed by attaching multiple individual parts, not all of which need to be light transmitting. For example, such a housing can include an opaque lower portion and a lens or other transparent cover attached to the lower portion to cover the LEDs 20. The housing 14 can be manufactured to include light diffusing or refracting properties, such as by surface roughening or applying a diffusing film to the housing 14. For compatibility with the fixture 12 as discussed above, the housing 14 can have a length such that the light 10 is approximately 48" long, and the housing 14 can have a 0.625", 1.0", or 1.5" diameter.

The circuit board 16 as illustrated in FIG. 1 is an elongate printed circuit board. Multiple circuit board sections can be joined by bridge connectors to create the circuit board 16. The circuit board 16 as shown in FIG. 1 is slidably engaged with the housing 14, though the circuit board 16 can alternatively be clipped, adhered, snap- or friction-fit, screwed or otherwise connected to the housing 14. For example, the circuit board 16 can be mounted on a heat sink that is attached to the housing 14. Also, other types of circuit boards may be used, such as a metal core circuit board. Or, instead of a circuit board 16, other types of electrical connections (e.g., wires) can be used to electrically connect the LEDs 20 to a power source.

The light 10 can include two bi-pin end caps 18 (i.e., each end cap 18 can carry two pins), one at each longitudinal end of the housing 14, for physically and electrically connecting the light 10 to the fixture 12. The end caps 18 can be the sole physical connection between the light 10 and the fixture 12. The end caps 18 can be electrically connected to the circuit board 16 to provide power to the LEDs 20. Each end cap 18 can include two pins, though two of the total four pins can be "dummy pins" that do not provide an electrical connection. Alternatively, other types of electrical connectors can be used, such as an end cap carrying a single pin. Also, while the end caps 18 are shown as including cup-shaped bodies, apparatuses having a different configuration can alternatively be used (e.g., plugs lodged in ends of the housing 14 can carry pins or other electrical connectors). One or both of the end caps 18 can additionally include electric components, such as a rectifier and filter.

The LEDs 20 can be surface-mount devices of a type available from Nichia, though other types of LEDs can alternatively be used. For example, although surface-mounted LEDs 20 are shown, one or more organic LEDs can be used in place of or in addition thereto. The LEDs 20 can be mounted to the circuit board 16 by solder, a snap-fit connection, or other means. The LEDs 20 can produce white light. However, LEDs that produce blue light, ultra-violet light or other wavelengths of light can be used in place of white light emitting LEDs 20.

The number of LEDs 20 can be a function of the desired power of the light 10 and the power of the LEDs 20. For a 48" light, such as the light 10, the number of LEDs 20 can vary from about five to four hundred such that the light 10 outputs approximately 500 to 3,000 lumens. However, a different number of LEDs 20 can alternatively be used, and the light 10 can output a different amount of lumens. The LEDs 20 can be evenly spaced along the circuit board 16, and the spacing of the LEDs 20 can be determined based on, for example, the light distribution of each LED 20 and the number of LEDs 20.

The controller 22 can be digital and include a CPU and a memory, such as RAM or another type of memory, though a controller including analog circuits can be used. The controller 22 can be mounted on the circuit board 16 to communicate with other components and to receive power from one or both of the end caps 18. Alternatively, the controller 22 can be coupled to a different power source such as a battery. The controller 22 can be configured to control an amount of power provided to each LED 20 using pulse width modulation. A program for controlling the LEDs 20 can be stored on the memory for execution by the CPU. The controller 22 can further include a signal receiver. The signal receiver can be hard-wired (e.g., using a telephone line, current-carrying wire, or Ethernet cable) to a signal source to receive a signal, or the signal receiver can be configured to wirelessly receive the signal using a standardized protocol such as IEEE 802.11, a protocol for radio communication, Bluetooth, a cellular standard (e.g., 3G or another cellular standard), or another wireless protocol. The signal receiver can be in communication with the CPU. The functionality of the controller is discussed below in greater detail in reference to FIGS. 2 and 3.

Figure 2:
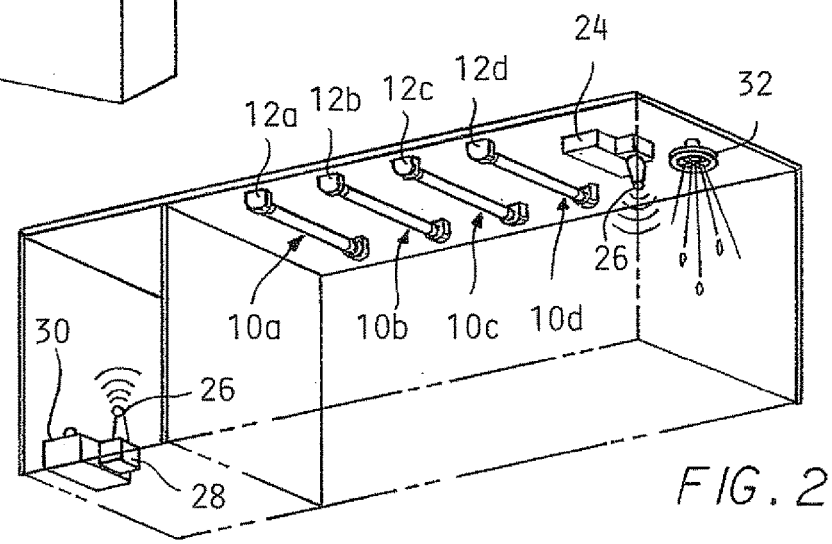
FIG. 2 is a schematic side view schematic of an example of an emergency lighting system including multiple LED-based lights.

FIG. 2 illustrates multiple lights 10*a*, 10*b*, and 10*c* installed in separate fixtures 12*a*, 12*b*, and 12*c*, respectively. One or more emergency detectors, illustrated as a smoke detector 24 and a power monitor 28 in communication with a power source 30 (e.g., an electric power line, a transformer, a generator, or another power source), can detect the presence of an emergency, which in the example shown in FIG. 2 can be smoke or a defect in the power source 30. Other emergency detectors can include a fire alarm, a burglar alarm, an alarm to indicate a door is ajar, a tornado alarm, an air raid siren, or some other type of alarm. The detected emergency can be a fire, a trespasser, an ajar door, a tornado, an air raid signal, or another event for which a warning is helpful. Each emergency detector can include a self-contained sensor to detect the emergency, e.g., the smoke detector 24 can include an optical detector or an ionization detector. Alternatively, an emergency detector can be in communication with some other device for indicating the presence of an emergency, e.g., a tornado alarm can be in communication with a weather service.

Each emergency detector can also include a signal transmitter 26 operable to transmit an emergency signal α to the controller 22 in response to detection of an emergency. Alternatively, multiple emergency detectors can be in communication with a single signal transmitter. When multiple emergency detectors are in communication with a single signal transmitter, the single signal transmitter can be in communication with the signal receiver in the controller 22 of each light 10*a*, 10*b*, and 10*c* via hard-wiring or wireless communication using one of the protocols mentioned above. The transmitters 26 shown in FIG. 2 can also be operable to transmit an alarm notification β to a response system, such as an illustrated sprinkler system 32, an emergency response center or a security office, an automatic door locking system, or another location. Like the emergency signal α, the alarm notification β can be sent through a wired connection (such as a telephone line) or wirelessly using one of the protocols mentioned above or another wireless protocol.

In operation, during a normal mode of operation in which no emergency is detected, the controller 22 can control the LEDs 20 to produce a generally constant flux of light (i.e., the controller 22 can provide a generally constant amount of power to the LEDs 20 such that the LEDs 20 do not appear to flicker). The exact amount of light produced during the normal mode need not be constant under all conditions. For example, the controller 22 can vary the power in response to a dimmer switch, ambient light conditions, or some other circumstances.

Figure 3:
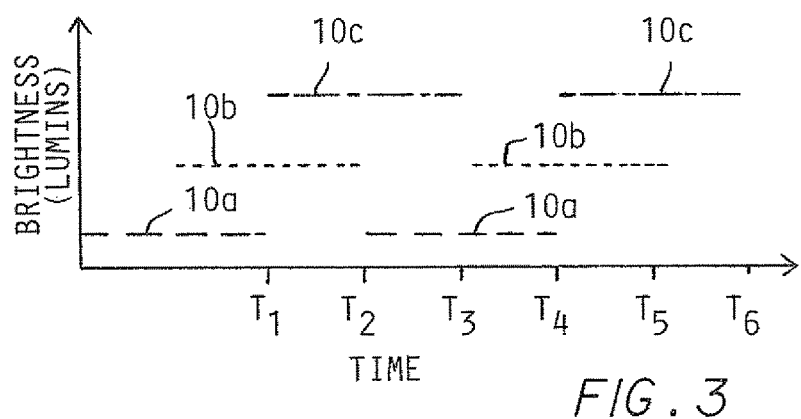
FIG. 3 is a graph showing an example of light produced by the emergency lighting system of FIG. 2 when operating in an emergency mode.

Upon the occurrence of an emergency, the emergency detector can detect the emergency and communicate the presence of an emergency to the transmitter 26. The transmitter 26 can transmit the emergency signal α to the controller 22 and the notification signal β to the response system. Upon receiving the emergency signal α, the controller 22 can operate the lights 10a, 10b, and 10c in an emergency mode. The emergency mode can include operating the lights 10a, 10b, and 10c to indicate a direction, such as a direction toward an exit, a direction away from the emergency, or a direction toward the emergency. For example, as shown in FIG. 3, light 10a can produce light at a first brightness level while lights 10b and 10c are off. Light 10a can stop producing light, and light 10b can begin producing light at a second brightness level greater than the first brightness level. Light 10b can then stop producing light, and light 10c can begin producing light at third brightness level greater than the second brightness level. As a result, the lights 10a, 10b, and 10c can produce an increasingly bright pattern of light moving toward the smoke detector 24. The pattern can be reversed, with light 10c first operating at the first brightness level, followed by operation of light 10b at the second brightness level, then light 10c at the third brightness level to produce a pattern in the opposite direction.

Operating in the emergency mode can include other light patterns from the pattern described with reference to FIG. 3. As an example, all of lights 10a, 10b, and 10c can remain on while each successive light 10a, then 10b, and then 10c increases or decreases in brightness to produce a pattern of light toward or away from the emergency. As another example, the pattern can be based on the location of the lights 10a, 10b, and 10c relative to the emergency, such as by operating one of the lights 10a, 10b, and 10c nearest the emergency or nearest an exit in a manner to indicate that the emergency or the exit is nearby (e.g., illuminating the light brighter than other lights or flashing the light in a unique pattern).

Figure 4:
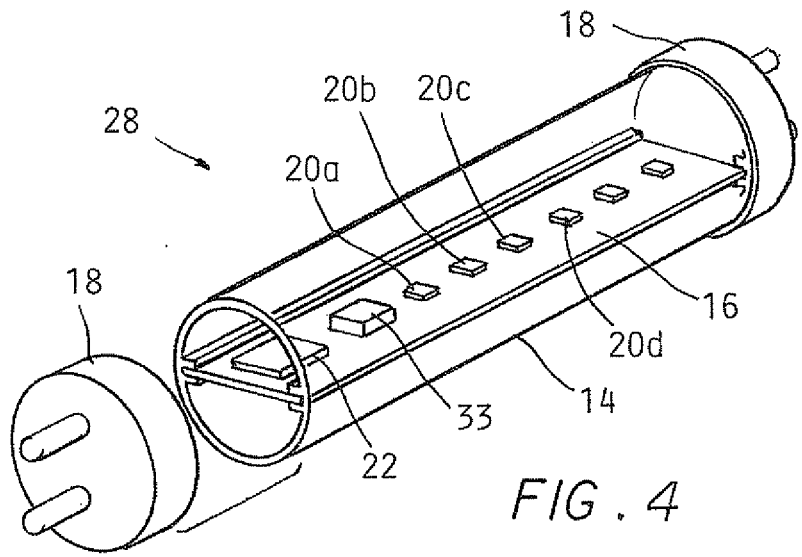
FIG. 4 is a schematic perspective schematic view of another example of an LED-based light for use in an emergency lighting system.
Figure 5:
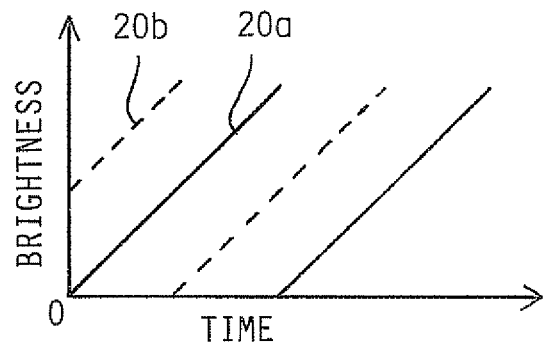
FIG. 5 is a graph showing an example of light produced by the LED-based light of FIG. 4 when operating in an emergency mode.

As yet another example of a pattern of light produced during emergency mode operation, FIG. 4 illustrates another light 28 including the housing 14, circuit board 16, and end caps 18 as described with reference to the light 10. The light 28 additionally includes multiple LEDs 20, with LEDs 20a-d illustrated (though a greater or fewer number of LEDs 20 can be included). The LEDs 20a-d can be illuminated at different brightness levels from each other to produce a pattern. For example, as shown in FIG. 5, LED 20b can be brighter than LED 20a, and both lights can increase in brightness. When LED 20b reaches a predetermined brightness, its brightness can be reduced to a low level before being increased back to the predetermined level. Similarly, the brightness of the LED 20a can be controlled in the same manner, though the LED 20a reaches the predetermined brightness level at a later point in time than the LED 20b. LEDs 20c and 20d can be controlled similarly such that LED 20d reaches the predetermined brightness level first, followed by LED 20c, then LED 20b, and lastly LED 20a. As a result, the light 28 appears to produce a bright line travelling in the direction from LED 20a toward LED 20d. This bright line can be controlled in a direction toward an emergency or an exit or away from the emergency. If the light 28 is near the emergency, the LEDs 20a-d can be controlled in a different manner, such as by flashing or creating two lines pointing toward a center of the light 28.

Additionally, operation of the lights 10a, 10b, and 10c can include modifying the production of light in ways other than producing patterns. For example, if the power monitor 28 detects a defect in the power source 30, such as a power outage, operating a generator to provide power, a low level of power remaining in a generator, or some other indication that the power source 30 is not operating under normal conditions, the transmitter 26 in communication with the power monitor 28 can transmit the emergency signal α to the signal receiver of the controller 22 in each light 10a, 10b, and 10c. Each controller 22 can reduce an amount of power supplied to each light 10a, 10b, and 10c by reducing the brightness of all LEDs 20, no longer providing power to some of the LEDs 20, or a combination of the two.

Figure 6:
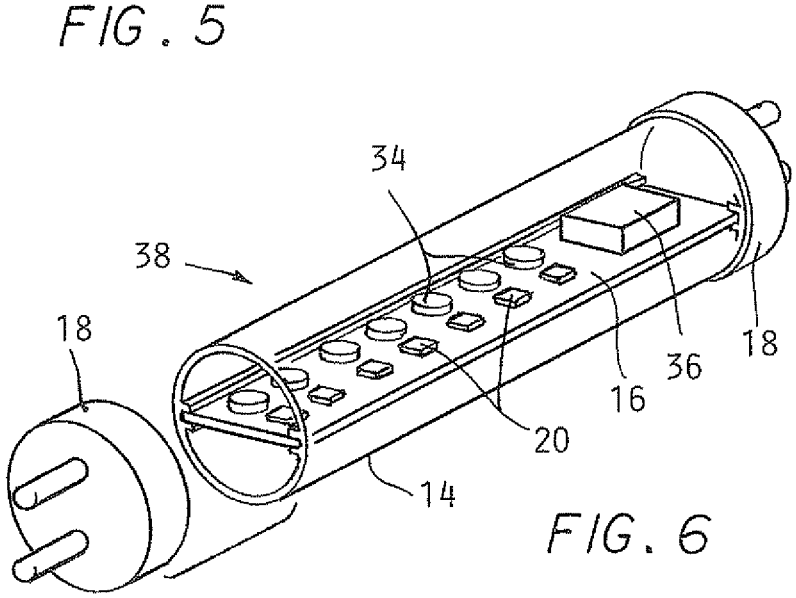
FIG. 6 is a schematic perspective view of yet another example of an LED-based light for use in an emergency lighting system.

As another example, FIG. 6 illustrates a light 38 having a similar structure as the light 10 (i.e., including the housing 14, the circuit board 16, the end caps 18, and the LEDs 20), but additionally including a group of color-producing LEDs 34. The LEDs 34 can produce a different color of light than the LEDs 20. For example, if the LEDs 20 produce white light, the LEDs 34 can produce red light, green light, orange light, or another color of light. Additionally, two groups of LEDs 34 that produce different colors can be included, such as a group of green light producing LEDs and a group of red light producing LEDs. Operation in the emergency mode can include powering the colored LEDs 34. For example, the LEDs 34 can be turned on or flash to indicate the presence of an emergency. The LEDs 34 can also perform other functions, such as producing a directional pattern of light to as described above in reference to FIG. 4. Additionally, having multiple colors of LEDs 34 can allow more versatile guiding. For example, a green group of the LEDs 34 can indicate a pattern toward an exit, while a red group of LEDs 34 can indicate a pattern toward the emergency.

Regarding the notification signal β, the response system can take an appropriate action upon receiving the notification signal β. For example, referring back to FIG. 2, if the response system includes the sprinkler system 32 and the notification signal β indicates the presence of a fire, the sprinkler system 32 can release water. As another example, if the response system includes an emergency response center (e.g., a security center, a fire station, or a paramedic), personnel at the emergency response center can respond accordingly. Additionally, the notification signal β can communicate the location of the emergency to aid in the response to the emergency. For example, the sprinkler system 32 can release water only in locations in which a fire is detected, though the sprinkler system can also release water in other areas, e.g., adjacent areas likely to be affected by the fire. As another example, the notification signal β can alert personnel at the emergency response center of the location of the emergency (e.g., a fire is on the third floor of the southwest wing of a building).

While the emergency detector has been described as being separate from the light 10 shown in FIG. 1, the emergency detector can alternatively be included in the package defined by the housing 14 and end caps 18 as shown in the lights 28 and 38. That is, as shown in FIG. 4, the light 28 includes both a controller 22 and an emergency detector 33. The emergency detector 33 can include a sensor to detect one or more types of emergencies, such as a fire, smoke, a trespasser, or another emergency. That is, the sensor can include a motion sensor to detect a trespasser, an optical or ionization detector for smoke detection, a receiver to receive an emergency broadcast from (e.g., a weather service), and/or some another type of sensor to detect an emergency. Similarly, the light 38 as shown in FIG. 6 can include a single component 36 functioning as both a detector and controller. That is, the detector and controller can be integral to the single component 36. Thus, the lights 28 and 38 can be installed in the fixture 12 to provide an alarm system without the need for modifications to an existing lighting or alarm infrastructure (e.g., without the need for installing wires to a separate emergency detector or upgrading an emergency detector to transmit a wireless signal).

In addition to being installable in a standard fixture, e.g., the fixture 12, the lights 10, 28, 38 can provide other benefits. For example, the directional patterns produced by LEDs 20 can lead a viewer toward or away from the emergency, toward an exit or stairwell, or in another direction. Also, as a result of using LEDs 20, which can produce light virtually instantaneously upon receiving power, the lights 10, 28, and 38 can produce patterns that are impractical with a fluorescent tube having a long start-up time. Further, the lights 10, 28, and 38 can be installed in a "smart building" for interaction with a central controller or emergency detector. The lights 10, 28, and 38 can reduce the amount of wiring required for an alarm system by combining multiple components in a single package, thereby reducing the cost of an emergency system. The lights 10, 28, and 38 can also improve the aesthetics of the building by eliminating known alarm systems, such as smoke detectors and fire alarms, that some may find visually unappealing.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. An LED-based light, comprising:
   a tubular housing configured to be installable in a standard light fixture;
   a plurality of LEDs disposed within the housing, the LEDs subject to operation in a normal mode, wherein at least some of the LEDs are operated to produce white light for general illumination, and in an emergency mode, wherein in the emergency mode:
      during a first time span, a brightness of a first LED of the plurality of LEDs is increased from a first brightness level to a second brightness level,
      at an end of the first time span, the brightness of the first LED is decreased to the first brightness level,
      during a second time span, a brightness of a second LED of the plurality of LEDs is increased from the first brightness level to the second brightness level,
      at an end of the second time span, the brightness of the second LED is decreased to the first brightness level, and
      wherein the first time span partially overlaps the second time span;
   an emergency detector disposed within the housing, the emergency detector having a sensor operable to detect an emergency and operable to produce an emergency signal in response to the emergency;
   a wireless signal transmitter disposed within the housing, the wireless signal transmitter operable to transmit an alarm notification to a response system in response to the emergency signal; and
   a connector arranged at an end of the housing, the connector configured for physical connection to one or more sockets of the standard light fixture such that, when the connector is physically connected to the one or more sockets, the housing, the plurality of LEDs, the emergency detector, and the wireless signal transmitter are secured in the standard light fixture.

2. The LED-based light of claim 1, wherein the plurality of LEDs comprise white light emitting LEDs and colored light emitting LEDs, the white light emitting LEDs being configured for operation in the normal mode to produce the white light for general illumination, and the colored light emitting LEDs being configured for operation in the emergency mode to at least partially produce a different color of light compared to the normal mode.

3. The LED-based light of claim 1, wherein the emergency detector's sensor is operable to detect at least one of smoke or a fire.

4. The LED-based light of claim 1, wherein the emergency detector's sensor is operable to detect at least one of a trespasser or a door ajar.

5. The LED-based light of claim 1, wherein the connector is one of a pair of connectors disposed at opposing ends of the housing and configured for physical connection to the one or more sockets of the standard light fixture.

6. The LED-based light of claim 1, wherein the response system is one of a security office or an automatic door locking system.

7. The LED-based light of claim 1, wherein the brightness of the first LED is linearly increased from the first brightness level to the second brightness level during the first time span.

8. A lighting system, comprising:
   an LED-based light having:
      a tubular housing configured to be installable in a standard light fixture;
      a plurality of LEDs disposed within the housing, the LEDs subject to operation in a normal mode, wherein at least some of the LEDs are operated to produce white light for general illumination, and in an emergency mode, wherein in the emergency mode:
         during a first time span, a brightness of a first LED of the plurality of LEDs is increased from a first brightness level to a second brightness level,
         at an end of the first time span, the brightness of the first LED is decreased to the first brightness level,
         during a second time span, a brightness of a second LED of the plurality of LEDs is increased from the first brightness level to the second brightness level;
         at an end of the second time span, the brightness of the second LED is decreased to the first brightness level,
         wherein the first time span partially overlaps the second time span;
      an emergency detector disposed within the housing, the emergency detector having a sensor operable to detect an emergency and operable to produce an emergency signal in response to the emergency,
      a wireless signal transmitter disposed within the housing, the wireless signal transmitter operable to transmit an alarm notification to a response system in response to the emergency signal; and a connector arranged at an end of the housing, the connector configured for physical connection to one or more sockets of the standard light fixture, such that, when the connector is physically connected to the one or more sockets, the housing, the plurality of LEDs, the emergency detector, and the wireless signal transmitter are secured in the standard light fixture; and a controller operable to:
receive the emergency signal; and
in response to the emergency signal, switch the operation of the LEDs from the normal mode to the emergency mode.

9. The lighting system of claim 8, wherein in the emergency mode at least some of the LEDs are operated to indicate the detection of the detected emergency.

10. The lighting system of claim 8, wherein in the emergency mode at least some of the LEDs are operated to indicate a location of the detected emergency.

11. The lighting system of claim 8, wherein in the emergency mode at least some of the LEDs are operated to produce a different level of light compared to the normal mode.

12. The lighting system of claim 8, wherein in the emergency mode at least some of the LEDs are operated to produce a different color of light compared to the normal mode.

13. The lighting system of claim 12, wherein the plurality of LEDs comprise white light emitting LEDs and colored light emitting LEDs, the white light emitting LEDs subject to operation in the normal mode to produce the white light for general illumination, and the colored light emitting LEDs subject to operation in the emergency mode to at least partially produce the different color of light compared to the normal mode.

14. The lighting system of claim 8, wherein in the emergency mode a brightness of the LEDs is varied to produce a pattern of light indicating a direction toward or away from a location of the detected emergency.

15. The lighting system of claim 8, wherein the emergency detector's sensor is operable to detect at least one of smoke or a fire.

16. The lighting system of claim 8, wherein the emergency detector's sensor is operable to detect at least one of a trespasser or a door ajar.

17. The lighting system of claim 8, wherein the controller is housed by the housing as a component of the LED-based light.

18. The lighting system of claim 8, wherein the controller is remote from the LED-based light.

19. An LED-based light, comprising:
a tubular housing configured to be installable in a standard fluorescent light fixture;
an elongate circuit board disposed within the housing, the circuit board carrying a plurality of LEDs, the LEDs subject to operation in a normal mode, wherein at least some of the LEDs are operated to produce white light for general illumination, and in an emergency mode, wherein in the emergency mode:
during a first time span, a brightness of a first LED of the plurality of LEDs is increased from a first brightness level to a second brightness level,
at an end of the first time span, the brightness of the first LED is decreased to the first brightness level,
during a second time span, a brightness of a second LED of the plurality of LEDs is increased from the first brightness level to the second brightness level;
at an end of the second time span, the brightness of the second LED is decreased to the first brightness level,
wherein the first time span partially overlaps the second time span;
an emergency detector, disposed within the housing, the emergency detector having a sensor operable to detect at least one of fire or smoke and operable to produce an emergency signal in response to the detection;
a wireless signal transmitter disposed within the housing, the wireless signal transmitter operable to transmit an alarm notification to a response system in response to the emergency signal;
a pair of end caps disposed at opposing ends of the housing, each end cap including a bi-pin connector configured for physical connection to a respective socket in the standard fluorescent light fixture.

20. The LED-based light of claim 19, further comprising:
a controller operable to:
receive the emergency signal; and
in response to the emergency signal, switch the operation of the LEDs from the normal mode to the emergency mode.

21. The LED-based light of claim 7, wherein the brightness of the second LED is linearly increased from the first brightness level to the second brightness level during the second time span.

* * * * *